United States Patent
White et al.

(10) Patent No.: US 12,484,468 B2
(45) Date of Patent: Dec. 2, 2025

(54) SYSTEMS, METHODS, AND/OR APPARATUS FOR THE DISPLAY OF AGRICULTURAL DATA ON A USER INTERFACE

(71) Applicant: Kinze Manufacturing, Inc., Williamsburg, IA (US)

(72) Inventors: Jordan J. White, Williamsburg, IA (US); Jason Schoon, Williamsburg, IA (US); Ryan Mcmahan, Williamsburg, IA (US); Greg Ryan, Williamsburg, IA (US); Kyle B. Wetjen, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 927 days.

(21) Appl. No.: 17/446,321

(22) Filed: Aug. 30, 2021

(65) Prior Publication Data

US 2022/0078963 A1 Mar. 17, 2022

Related U.S. Application Data

(60) Provisional application No. 62/706,818, filed on Sep. 11, 2020.

(51) Int. Cl.
*A01B 79/00* (2006.01)
*A01B 63/00* (2006.01)
(Continued)

(52) U.S. Cl.
CPC .......... *A01B 79/005* (2013.01); *A01B 63/008* (2013.01); *A01B 79/02* (2013.01);
(Continued)

(58) Field of Classification Search
None
See application file for complete search history.

(56) References Cited

U.S. PATENT DOCUMENTS

| 5,598,167 A * | 1/1997 | Zijderhand | G08G 1/127 |
| | | | 701/517 |
| 2013/0268191 A1 * | 10/2013 | Telang | G06Q 10/08 |
| | | | 701/468 |

(Continued)

FOREIGN PATENT DOCUMENTS

| EP | 0821296 A2 * | 1/1998 | |
| JP | 2016170814 A * | 9/2016 | |
| WO | WO-2018102705 A1 * | 6/2018 | A01B 49/06 |

OTHER PUBLICATIONS

Translation of JP 2016170814A (Year: 2016).*

(Continued)

*Primary Examiner* — Peter D Nolan
*Assistant Examiner* — Michael F Whalen
(74) *Attorney, Agent, or Firm* — McKee, Voorhees & Sease, PLC

(57) ABSTRACT

The use of maps provides planter performance feedback over time in a field and is used in conjunction with traditional onscreen maps so as to quickly see highly detailed numerical and textual information about given areas on a map. Aspects of the graphical user interface are made easier to read in an unobtrusive way through use of a multi-purpose touch-screen display small enough to fit in a tractor cab.

20 Claims, 21 Drawing Sheets

(51) Int. Cl.
  *A01B 79/02* (2006.01)
  *B60K 35/10* (2024.01)
  *B60K 35/22* (2024.01)
  *B60K 35/28* (2024.01)
  *G01S 19/13* (2010.01)

(52) U.S. Cl.
  CPC .............. *B60K 35/10* (2024.01); *B60K 35/22* (2024.01); *B60K 35/28* (2024.01); *B60K 2360/1438* (2024.01); *B60Y 2200/22* (2013.01); *G01S 19/13* (2013.01)

(56) References Cited

U.S. PATENT DOCUMENTS

| | | | |
|---|---|---|---|
| 2019/0212902 A1* | 7/2019 | Allgaier | G06F 3/04845 |
| 2019/0343035 A1* | 11/2019 | Smith | A01B 69/004 |
| 2020/0110423 A1 | 4/2020 | Antich | |
| 2022/0067121 A1* | 3/2022 | Huber | G06F 30/12 |

OTHER PUBLICATIONS

Battiato et al., "A locally adaptive zooming algorithm for digital images", Image and Vision Computing, vol. 20, pp. 805-812, 2002.
Bilinear Interpolation—Wikipedia, https://en.wikipedia.org/wiki/Bilinear_interpolation, 3 pages, Aug. 8, 2020.
VIPER/VIPER 4+ Installation & Operation Manual, Manual No. 016-0171-539 Rev. G, E29196, pp. 1-184, Sep. 2017.

\* cited by examiner

Algorithm 400

Suppose that we want to find the value of the unknown function $f$ at the point $(x, y)$. It is assumed that we know the value of $f$ at the four points $Q_{11} = (x_1, y_1)$, $Q_{12} = (x_1, y_2)$, $Q_{21} = (x_2, y_1)$, and $Q_{22} = (x_2, y_2)$.

We first do linear interpolation in the $x$-direction. This yields $$f(x, y_1) \approx \frac{x_2 - x}{x_2 - x_1} f(Q_{11}) + \frac{x - x_1}{x_2 - x_1} f(Q_{21}),$$
$$f(x, y_2) \approx \frac{x_2 - x}{x_2 - x_1} f(Q_{12}) + \frac{x - x_1}{x_2 - x_1} f(Q_{22}). \quad \underset{\sim}{401}$$

We proceed by interpolating in the $y$-direction to obtain the desired estimate:

$$\begin{aligned}
f(x, y) &\approx \frac{y_2 - y}{y_2 - y_1} f(x, y_1) + \frac{y - y_1}{y_2 - y_1} f(x, y_2) \quad \underset{\sim}{402}\\
&= \frac{y_2 - y}{y_2 - y_1} \left( \frac{x_2 - x}{x_2 - x_1} f(Q_{11}) + \frac{x - x_1}{x_2 - x_1} f(Q_{21}) \right) + \frac{y - y_1}{y_2 - y_1} \left( \frac{x_2 - x}{x_2 - x_1} f(Q_{12}) + \frac{x - x_1}{x_2 - x_1} f(Q_{22}) \right)\\
&= \frac{1}{(x_2 - x_1)(y_2 - y_1)} (f(Q_{11})(x_2 - x)(y_2 - y) + f(Q_{21})(x - x_1)(y_2 - y) + f(Q_{12})(x_2 - x)(y - y_1) + f(Q_{22})(x - x_1)(y - y_1))
\end{aligned}$$

$$f(x, y) = \frac{1}{(x_2 - x_1)(y_2 - y_1)} \begin{bmatrix} x_2 - x & x - x_1 \end{bmatrix} \begin{bmatrix} f(Q_{11}) & f(Q_{12}) \\ f(Q_{21}) & f(Q_{22}) \end{bmatrix} \begin{bmatrix} y_2 - y \\ y - y_1 \end{bmatrix}. \quad \underset{\sim}{403}$$

Note that we will arrive at the same result if the interpolation is done first along the $y$ direction and then along the $x$ direction.[1]

*FIG. 17A (PRIOR ART)*

Alternative algorithm 450

An alternative way to write the solution to the interpolation problem is $$f(x,y) \approx a_0 + a_1 x + a_2 y + a_3 xy, \quad 451$$

where the coefficients are found by solving the linear system $$\begin{bmatrix} 1 & x_1 & y_1 & x_1 y_1 \\ 1 & x_1 & y_2 & x_1 y_2 \\ 1 & x_2 & y_1 & x_2 y_1 \\ 1 & x_2 & y_2 & x_2 y_2 \end{bmatrix} \begin{bmatrix} a_0 \\ a_1 \\ a_2 \\ a_3 \end{bmatrix} = \begin{bmatrix} f(Q_{11}) \\ f(Q_{12}) \\ f(Q_{21}) \\ f(Q_{22}) \end{bmatrix}, \quad 452$$

yielding the result

453

$$a_0 = \frac{f(Q_{11})x_2 y_2}{(x_1-x_2)(y_1-y_2)} + \frac{f(Q_{12})x_2 y_1}{(x_1-x_2)(y_2-y_1)} + \frac{f(Q_{21})x_1 y_2}{(x_1-x_2)(y_2-y_1)} + \frac{f(Q_{22})x_1 y_1}{(x_1-x_2)(y_1-y_2)},$$

$$a_1 = \frac{f(Q_{11})y_2}{(x_1-x_2)(y_2-y_1)} + \frac{f(Q_{12})y_1}{(x_1-x_2)(y_1-y_2)} + \frac{f(Q_{21})y_2}{(x_1-x_2)(y_1-y_2)} + \frac{f(Q_{22})y_1}{(x_1-x_2)(y_2-y_1)},$$

$$a_2 = \frac{f(Q_{11})x_2}{(x_1-x_2)(y_2-y_1)} + \frac{f(Q_{12})x_2}{(x_1-x_2)(y_1-y_2)} + \frac{f(Q_{21})x_1}{(x_1-x_2)(y_1-y_2)} + \frac{f(Q_{22})x_1}{(x_1-x_2)(y_2-y_1)},$$

$$a_3 = \frac{f(Q_{11})}{(x_1-x_2)(y_1-y_2)} + \frac{f(Q_{12})}{(x_1-x_2)(y_2-y_1)} + \frac{f(Q_{21})}{(x_1-x_2)(y_2-y_1)} + \frac{f(Q_{22})}{(x_1-x_2)(y_1-y_2)}.$$

If a solution is preferred in terms of $f(Q)$, then we can write $$f(x,y) \approx b_{11} f(Q_{11}) + b_{12} f(Q_{12}) + b_{21} f(Q_{21}) + b_{22} f(Q_{22}), \quad 461$$

where the coefficients are found by solving $$\begin{bmatrix} b_{11} \\ b_{12} \\ b_{21} \\ b_{22} \end{bmatrix} = \left( \begin{bmatrix} 1 & x_1 & y_1 & x_1 y_1 \\ 1 & x_1 & y_2 & x_1 y_2 \\ 1 & x_2 & y_1 & x_2 y_1 \\ 1 & x_2 & y_2 & x_2 y_2 \end{bmatrix}^{-1} \right)^T \begin{bmatrix} 1 \\ x \\ y \\ xy \end{bmatrix}. \quad 463$$

*FIG. 17B (PRIOR ART)*

SYSTEMS, METHODS, AND/OR APPARATUS FOR THE DISPLAY OF AGRICULTURAL DATA ON A USER INTERFACE

CROSS REFERENCE TO RELATED APPLICATIONS

This application claims priority under 35 U.S.C. § 119 to provisional patent application U.S. Ser. No. 62/706,818, filed Sep. 11, 2020. The provisional patent application is herein incorporated by reference in its entirety, including without limitation, the specification, claims, and abstract, as well as any figures, tables, appendices, or drawings thereof.

FIELD OF THE INVENTION

The present invention relates generally to computerized methods, systems, and apparatuses for the display of agricultural data on a user interface. More particularly, but not exclusively, the present invention relates to an interactive user interface which facilitates identification of completed tasks during farming.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Agricultural implements perform a variety of agricultural operations. For example, an agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disk, and a seed chute. The housing is constructed such that it creates a reservoir to hold a seed pool. The seed disk resides within the housing and rotates about a generally horizontal central axis. As the seed disk rotates, it passes through the seed pool where it picks up individual seeds. The seeds are subsequently dispensed into the seed chute where they drop into the seed furrow. The seed meters are given a location along a toolbar of a planter, and the location determines at least some functionality of the meter.

Over the years, improvements to components on the planters, including actuators (hydraulic, pneumatic, electric, or a combination thereof), sensors, data handling systems, location systems, communication systems, lighting systems, and other systems capable of controlling functions of the planter, have increasingly automated the planter. As a result, components of the planter now rarely perform their respective functions in isolation.

Rather, and for example, the accuracy of the planting operation not only relies upon the mechanical planting components, but sensors located on the planter which help determine how often and at what depth seeds are to be planted at. These same sensors might then help determine which, when, and to what degree certain actuators, such as downforce actuators, should be engaged, and so forth to help facilitate these goals.

In some agricultural implements, the degree to which the components are interrelated and automated are so great the agricultural implement can be considered mostly or even fully autonomous, requiring little to no human input in order to operate. Farmers have thus been presented with new hurdles.

For example, planters apply multiple operations to a field simultaneously (plant seed, fertilize, apply insecticide, adjust ground pressure). Users can have difficulty knowing that issues have occurred and are continuing to occur with various planting systems. It can also be difficult to determine the length of time the issue occurred and the extent of the issue. Common types of issues are setpoint entry error by user and issues with the planter unable to perform commanded operations at given setpoints due to mechanical failure. Many systems are divided onto row units and it can be difficult to determine which rows are malfunctioning.

Still further, as the planters become more autonomously updated on a location-by-location basis, such as by updating different planting characteristics (downforce, depth, population, speed, fertilizer, etc.) based on any number of inputs, such as soil type, planter speed, weather conditions, etc., a user may need to be able to "look back" at an area that a task, such as planting, has occurred. Instead of stopping the planter to review the area, the user would like to be able to review the planted information on-the-fly.

Planters and other agricultural implements operating in the field often provide feedback to operators and real-time. That data might even be shared with other implements in real-time. Thus, there now exists a need in the art for improved methods, systems, and apparatuses on or in use with an agricultural implement to provide at least one of these devices or an operator the ability to identify potential issues with greater ease and speed so as to better mitigate issues associated with planting.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of the invention to join the use of maps with planter performance feedback over time in a field so as to quickly see highly detailed numerical and textual information about given areas on a map in and easy to read and unobtrusive way on a multi-purpose display small enough to fit in a tractor cab.

It is another object, feature, and/or advantage to provide a system that allows a user to view, upon a touch by the user, location associated with a particular area of a field in which a farming operation has occurred. The information provided can be of varying levels of detail and amounts of information but will provide information associated with the farming operation in the specific area chosen.

It is still yet a further object, feature, and/or advantage of the invention to predict where errors during planting are likely to occur and to provide a control system for mitigating such errors. The control system should treat computerized agricultural data and include appropriate graphic representations of any relevant real-time, expected, and/or historical planting.

It is still yet a further object, feature, and/or advantage of the invention to, after errors have been identified which require an operator to leave a vehicle, allow those operators to remove the display from the agricultural implement and/or to cast, mirror, and/or otherwise view from an external computing device the graphical user interface which includes the details of such errors.

It is still yet a further object, feature, and/or advantage of the invention to utilize color contrast and/or color indicators to more intuitively identify such errors to an operator. While so doing, backgrounds and/or non-essential data can be dimmed so as to conserve power to the display.

It is still yet a further object, feature, and/or advantage of the invention to use historical and/or sensed information to anticipate planting requirements and/or expected productivity. Differences in anticipated results and/or data can be calculated to identify errors and/or substandard planting operations/conditions.

It is still yet a further object, feature, and/or advantage of the invention to avoid using inexact approximations as much as possible. Where inexact approximations must be made, data based on the same should be marked accordingly, such as through the use of more data (e.g. tags) and/or with accompanying metadata.

It is still yet a further object, feature, and/or advantage of the invention to intuitively view and easily identify potential errors and/or issues in planting operations. For example, where feedback data is being shared by an implement in real-time, an operator or supervisor monitoring for potential issues can be remotely located from the implement having the issues. Comparisons in agricultural data collected from agricultural operations of other agricultural implements can also be utilized to identify said errors and issues.

It is still yet a further object, feature, and/or advantage of the invention to store and access agricultural data at a location remote of the agricultural implement, such as in a cloud-based storage system.

The computerized methods and systems disclosed herein can be used in a wide variety of agricultural operations, including planting, tilling, baling, harvesting, spraying, transporting, cultivating, harrowing, plowing, fertilizing, broadcasting, loading, unloading, and the like. Some aspects of the computerized methods and systems disclosed herein may even have use in other industries which rely heavily on communications and/or navigation, such as the automotive, nautical, and/or aerospace industries.

It is still yet a further object, feature, and/or advantage to support internet of things (IoT) and other environments in which information, data, or the like is transmitted efficiently with higher speed and higher bandwidth.

It is still yet a further object, feature, and/or advantage of the present invention to provide safe, cost effective, and reliable outcomes for farmers using the computerized methods disclosed herein.

It is still yet a further object, feature, and/or advantage of the present invention to display aspects of the computerized methods disclosed herein with distinct aesthetic features, including, but not limited to, maps, tables, and other text or images which otherwise enhance interfacing with electronics of the agricultural implement. For example, the user experience can be enhanced or otherwise further facilitated by means of a graphical user interface which presents the user with intuitive controls and/or automatically alerts an operator of the agricultural implement to potential problems and/or to prompt the operator for manual input, such as where potential problems cannot be resolved automatically. By way of another example, graphical user interfaces can be tailored to intuitively, such as by comparison, and simultaneously, such as in a compact space, show more than one data set.

It is still yet a further object, feature, and/or advantage of the invention to practice computerized methods which facilitate use, manufacture, assembly, maintenance, and repair of an agricultural implement accomplishing some or all of the previously stated objectives.

It is still yet a further object, feature, and/or advantage of the invention to incorporate a computerized method into electronic apparatuses or agricultural systems accomplishing some or all of the previously stated objectives. Unit(s) of the agricultural system can be partially or fully autonomous.

According to some aspects of the present disclosure, a computerized method for use with an agricultural implement comprises sensing agricultural characteristics associated with one or more agricultural implements, communicating, in real-time, agricultural data associated with the agricultural characteristics, displaying on a map and in real-time, the agricultural data on a touch-screen display, and automatically monitoring for error(s) associated with performance of an agricultural operation.

According to some additional aspects of the present disclosure, the agricultural data is time-stamped and is geo-spatial. Upon touching a mapped interface displayed with the touch-screen display, the time-stamped, geo-spatial agricultural data relating to a portion of the map is shown in a "zoomed-in" view. More detailed textual and numerical information can thus be revealed, perhaps indicating the source of errors which have occurred during, for example, planting.

According to some other aspects of the present disclosure, a non-transitory computer readable medium, such as one included on a touch-screen tablet display, is used with an agricultural implement and/or within an agricultural system. The non-transitory computer readable medium has a processor, a memory, an operating system, and a compiler. The non-transitory computer readable medium comprises a transmitter capable of employing at least one communication protocol and connecting to a network and a display module configured to instruct the processor to execute software and/or firmware stored within the memory. The processor is configured to execute the software and/or firmware such that time-stamped and/or geo-spatial agricultural data associated with sensed agricultural characteristics can be communicated and displayed on a map in real-time and error(s) associated with performance of an agricultural operation are automatically identified. If touched, a mapped interface displayed with the touch-screen display provides (i) a detailed view of a portion of said map; and (ii) numerical and textual information associated with agricultural data relating to said portion of said map.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 17A depicts a first exemplary algorithm which can be used in connection with executing a zoom feature.

FIG. 17B depicts a second exemplary algorithm which can be used in connection with executing a zoom feature.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
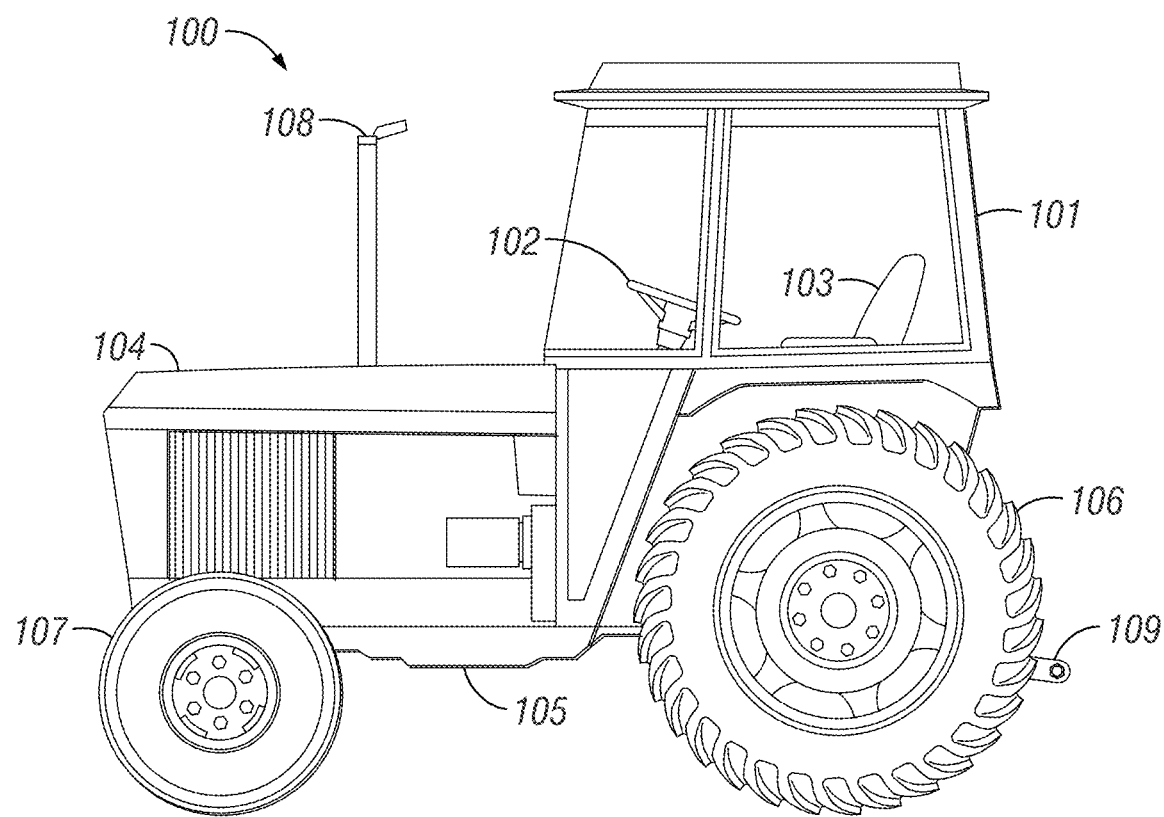
FIG. 1 shows a side elevational view tractor.

FIG. 1 shows a tractor 100 used to deliver high torque at slow speeds, for the purposes of hauling machinery used in agriculture. The tractor 100 includes a cab 101 with a steering wheel 102 and a seat 103 for an operator. The tractor 100 also includes a vehicle frame 104 which houses an engine (not shown) located near the front axle of the tractor 100 and in front of the cab 101. The cab 101 and vehicle frame 104 are supported, structurally, by the tractor's chassis 105, which attaches to rear drivable wheels 106 and front steerable wheels 107, said front steerable wheels 107 operationally connected to the steering wheel 102. An exhaust pipe 108 allows carbon monoxide to exit the tractor 100 during operation of the engine (not shown). A tractor hitch 109 allows for connection between agricultural machinery and the tractor 100.

Figure 2:
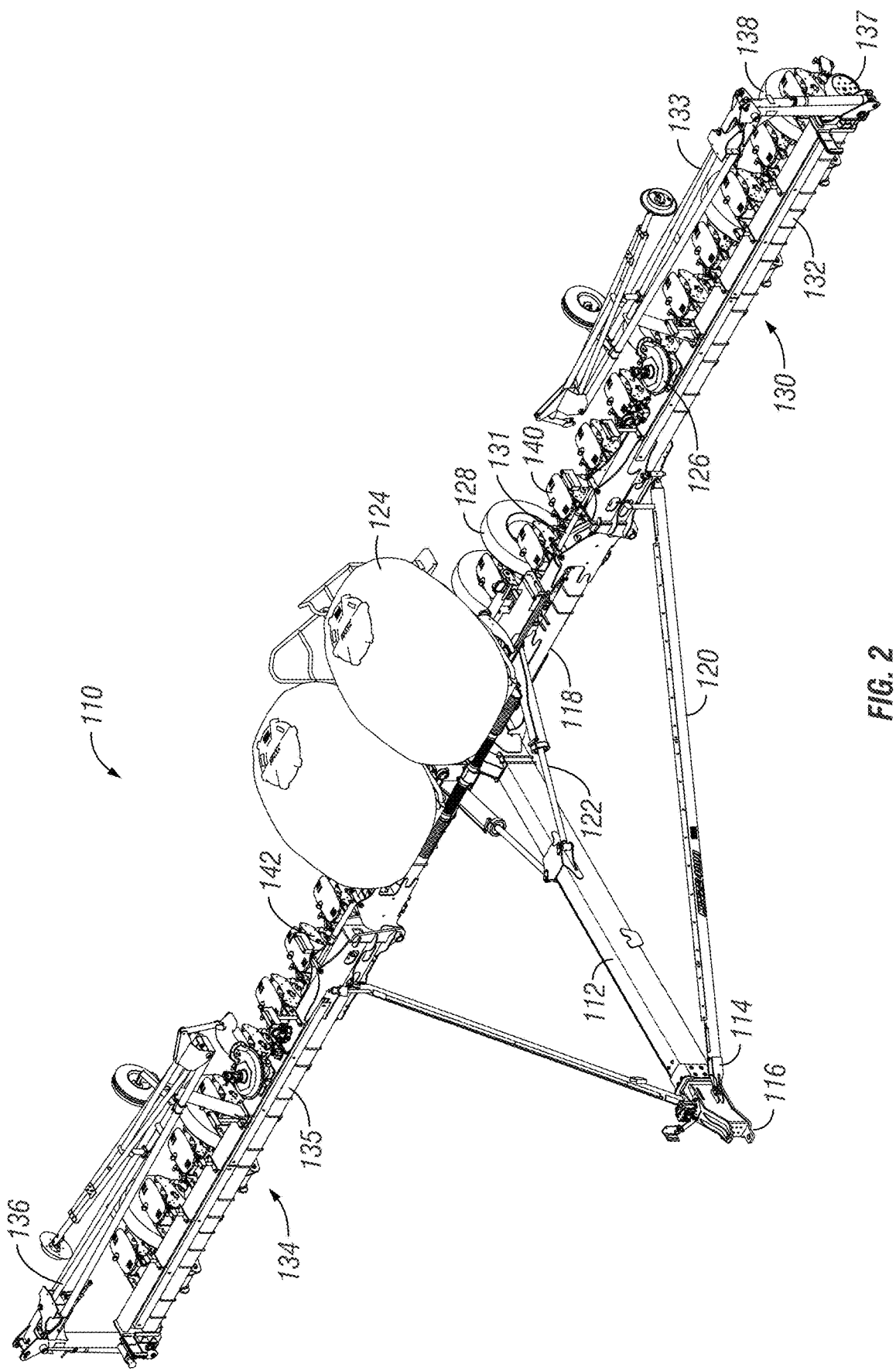
FIG. 2 shows a perspective view of a planter.

FIG. 2 shows a planter 110 used to plant and fertilize seed in a controlled manner. For example, the planter 110 as shown in FIG. 2 includes a tongue 112, preferably telescoping. The tongue 112 includes a first end 114 with an implement hitch 116 for attaching to a tow vehicle, such as the tractor 100. The opposite end of the tongue 112 is attached to a frame or central toolbar 118. Draft links 120 are connected between the central toolbar 118 and the tongue 112 and are used in conjunction with folding actuators 122 to fold the central toolbar 118 in a frontward manner. Therefore, the tongue 112 may be a telescoping tongue in that it can extend or track to allow for the front folding of the central toolbar 118. The central toolbar 118 includes first and second wings 130, 134 extending therefrom. The central toolbar 118 includes central hoppers 124 which contain seed or other granules used with planting. A plurality of transport wheels 128 also are connected to the central toolbar 118. The first and second wings 130, 134 are generally mere images of one another. The wings include first and second wing toolbars 132, 135. Attached along the central toolbar 118 as well as the first and second wing toolbar 132, 135, are a plurality of row units 140. The row units include seed meters 142 and/or other components used for planting and fertilizing seed in a controlled manner. Also connected to the first and second wings 130, 134 are first and second markers 133, 136. The markers include actuators 137 which are used to raise and lower the markers 133, 136. The markers 133, 136 can be lowered to provide guidance for the edge of a planter for use in planting. When not required, the markers can be lifted to a position as that shown in FIG. 2 to move the markers out of the way.

Also shown in FIG. 2 are a plurality of fans 126 as well as a plurality of wheels 138. The wings may also include actuators 131 to raise and lower or otherwise provide a downward force on the wings. Therefore, as is shown in FIG. 2, there are a multiplicity of components of the planting implement 110. The components may include moving parts, such as the actuators used to move the wings, markers, row units, etc., while also providing additional functions. For example, the fans 126 are used to provide a pressure in the seed meters 142 to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 140. Lights may also be included as part of the planter. Finally, an air seed delivery system may be provided between the central hoppers 124 and any plurality of seed meters 142 on the row units 140 in that the air seed delivery system provides a continued flow of seed to the row units on an as needed manner to allow for the continuous planting of the seed via the seed meters on the row units. Thus, the various controls of the planter may require or otherwise be aided by the use of an implement control system. The implement control system can aid in controlling each of the functions of the implement or planter 110 so as to allow for the seamless or near seamless operation with the implement, and also provides for the communication and/or transmission of data, status, and other information between the components.

Figure 3:
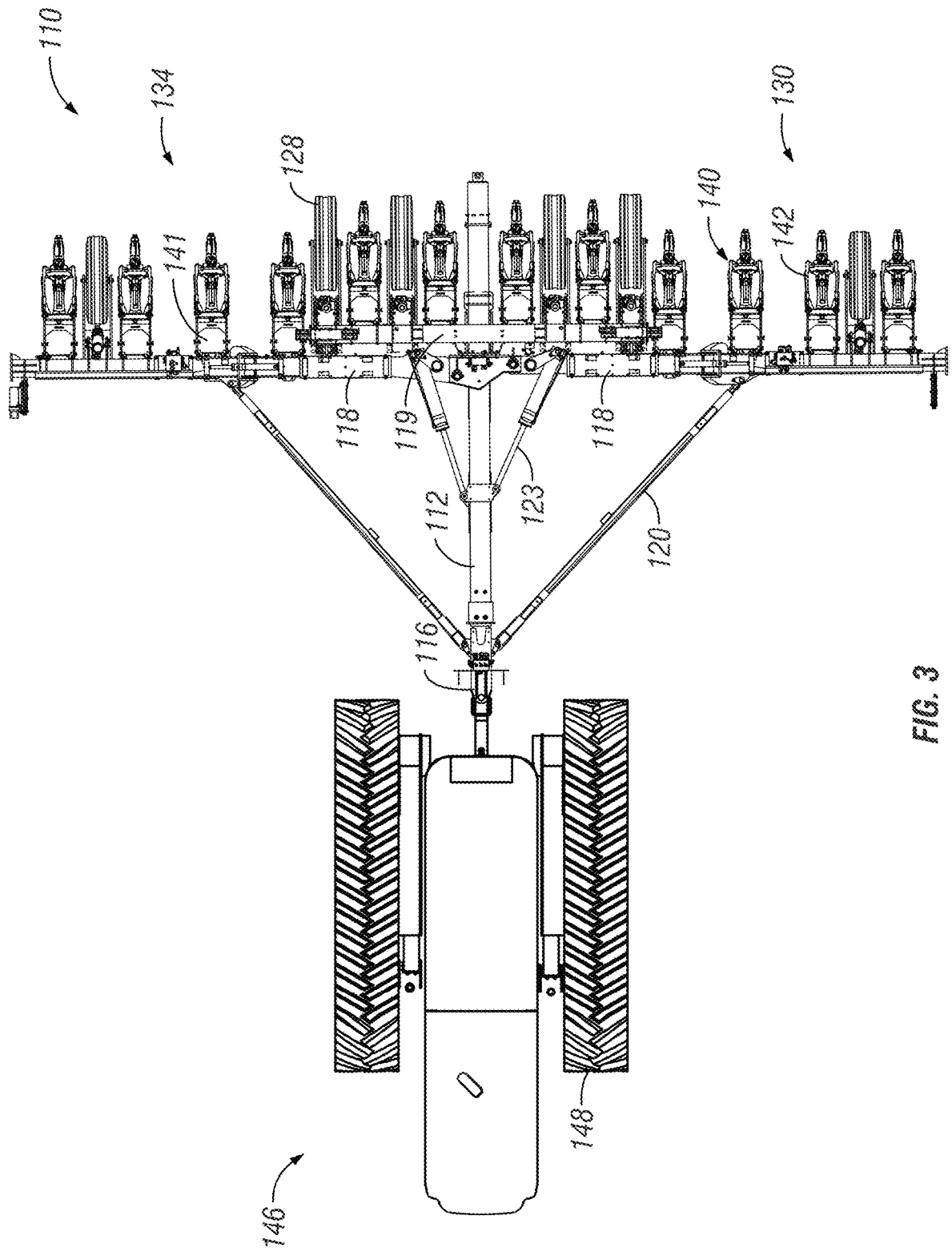
FIG. 3 shows a top plan view of the tug unit with the planter.

As shown in FIG. 3, the planter 110 can also be pulled by a self-propelled, autonomous tug unit 146, rather than an operator-driven vehicle, such as the tractor 100, such as the one shown and described in co-owned U.S. Pat. No. 10,575,453, which is herein incorporated by reference in its entirety. The rear drivable wheels 106 and front steerable wheels 107 can be substituted for tracks 148, regardless of whether said tracks 148 are implemented on an operator-driven vehicle or a self-propelled vehicle.

The amount of information being transmitted between the tractor and the components of the planter are ever growing and includes high traffic. Currently, any transmission of the information is done with low bandwidth, poorly defined protocol, and also includes compatibility issues among the various components of the tractor and/or implements. Therefore, issues have emerged, and new type have developed for a system including a high traffic mix, low latency, high security, high reliability, high throughput, common supply chain, and highly rugged system to allow for the operation of the implement and to aid in controlling the various components on or associated with the implement. Therefore, as well be understood, the present disclosure provides for solutions to meet said emerging requirements, which can include ruggedization and/or input/output (I/O) complements. The solution has been developed with standard protocols and components with adjacent opportunities in mind. The result becomes an intelligent internet of things based solution supporting a unique complement of functions and input/output features.

Figure 4:
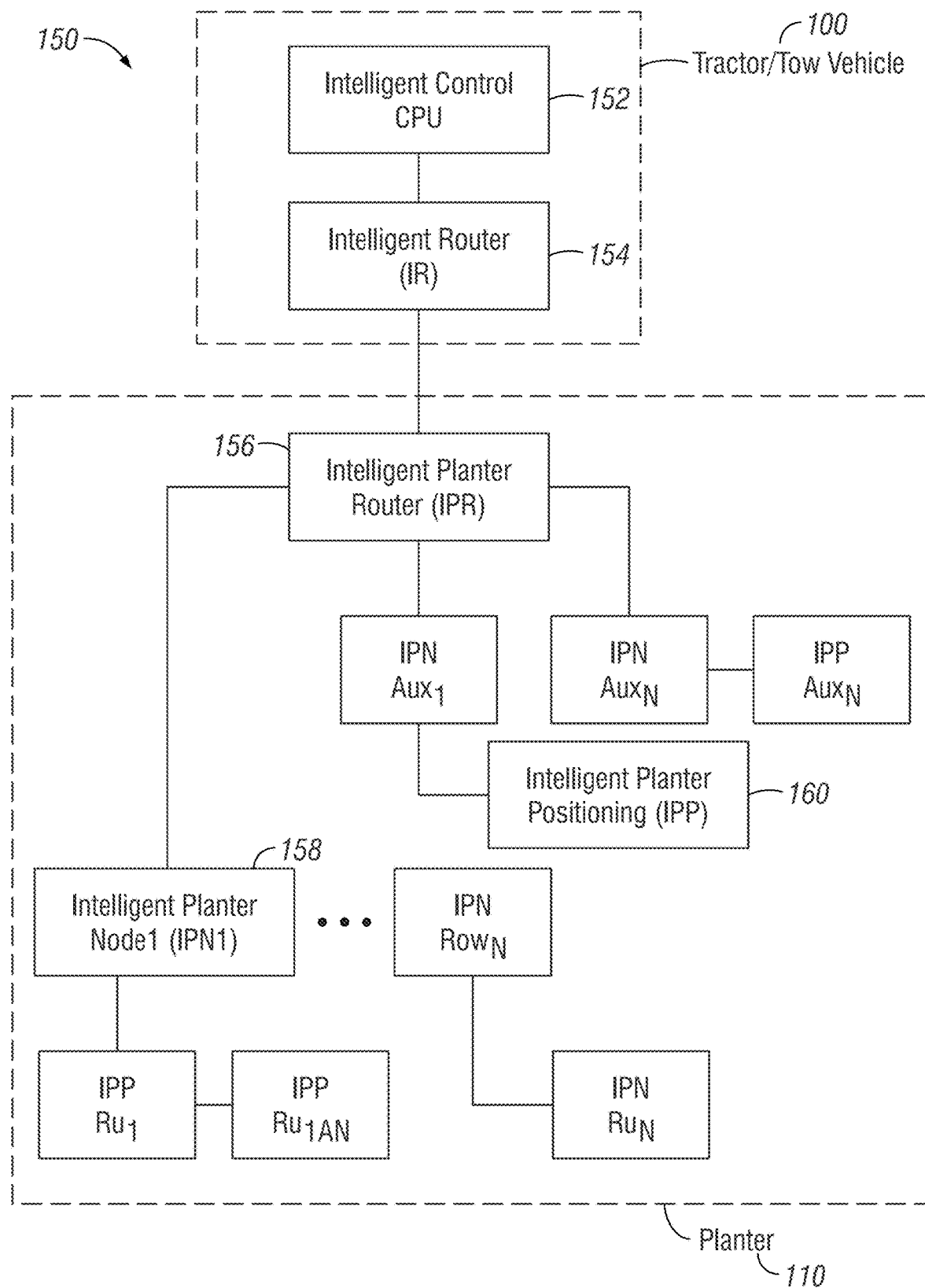
FIG. 4 is a schematic of an implement (planter) control system.

Therefore, FIG. 4 discloses an implement control system 150 according to aspects of the present disclosure. As is shown in the figure, some components of the implement control system 150 may be included not on the implement itself. For example, the implement control system as shown in the figure includes an intelligent control 152, which, for example, can employ a touch-screen display. Examples of such intelligent controls 152 may be tablets, telephones, handheld devices, laptops, user displays, or other computing devices capable of allowing input, providing options, and showing output of electronic functions. Still further examples include a microprocessor, a microcontroller, another suitable programmable device, other components implemented partially or entirely on a semiconductor (e.g., a field-programmable gate array ("FPGA") chip, such as a chip developed through a register transfer level ("RTL") design process).

The intelligent control 152 may be attached to or otherwise associated with an intelligent router unit 154. The intelligent router unit 154 can be included, but is not required in all instances. For example, when the intelligent control 152 is a tablet, the intelligent control 152 may not include the desired number of connections, inputs, and/or output capabilities. Therefore, the intelligent router 154 can be included to connect to the intelligent control 152 to provide additional inputs, outputs, and/or other connectivity to the intelligent control 152. The intelligent control 152 and/or intelligent router 154 can be remote of an implement, such as a planter 110. As shown in FIG. 4, the combination of the intelligent control 152 and intelligent router 154 are shown to be in the tractor 100 or other tow vehicle. When the intelligent control 152 is a tablet, the member can be positioned within the cab of a tractor to allow for the input and output to be shown on a display therein, such that an operator can view and interact with said display while in the tractor 100. However, it is to be appreciated that the control unit can be used generally anywhere remote of the planting implement.

Such a display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper).

FIG. 4 also shows components of the implement control system 150, which may be shown as part of the planter 110 or other implement. For example, some components may include an intelligent planter router ("IPR") 156, which can also be referred to as a planter personality module and is a type of intelligent implement router or intelligent router member. The IPR 156, as will be disclosed herein, provides for programmability to the planter, while also providing for connectivity to components and controls for various aspects of the planter. For example, the IPR 156 can include an intelligent control feature or member (central processing unit or the like) which can be programmed to provide information related to the planter 110. This can include the number of rows on a planter, type of planter, type of pressure for the seed meters, type of seed meters, number of seed meters, and generally any other information associated with the planter such that the information may be utilized to operate the functionality of the planter. Such programming of the IPR 156 can be done during manufacture of the planter, such as building thereof. Therefore, the IPR 156 can be programmed on an as-built basis to provide such information that can be transmitted with the other components of the implement control system 150. However, the configuration of the IPR 156 will provide information embedded in the CPU thereof during manufacture to provide options and settings for interaction with the other components of the implement control system 150. The IPR 156 can be connected to a plurality of intelligent planter nodes 258 which may be generically referred to as intelligent nodes or otherwise intelligent implement nodes.

The intelligent planter nodes (IPN) 158 can be used both for at the row units of a planter and/or for auxiliary functions of the planter. As shown in FIG. 4, the IPN 158 can be positioned at each row unit of the planter such that an IPN can be broken down by IPN row one, IPN row two all the way and up to IPN row N, wherein it is equal to the number of row units associated with the planter. Likewise, when the IPN 158 is used with an auxiliary function of the planter, the number of IPN's associated with the planter can be determined based on the number of auxiliary functions associated with the planter itself.

Still further, the implement control system 158 as shown in FIG. 4 includes a plurality of intelligent planter positioners (IPP) 160, generically referred to as intelligent positioning members or intelligent implement positioning members. The IPP 160, as will be disclosed herein can be utilized with each of the nodes or with any number of functions or components of the planter 110 to provide for additional information associated with the components. This can include the movement, location, or other data that can be collected via the IPP 160 that can be utilized and transmitted to the various components of the implement control system, such as the user display of the intelligent control 152.

Figure 5:
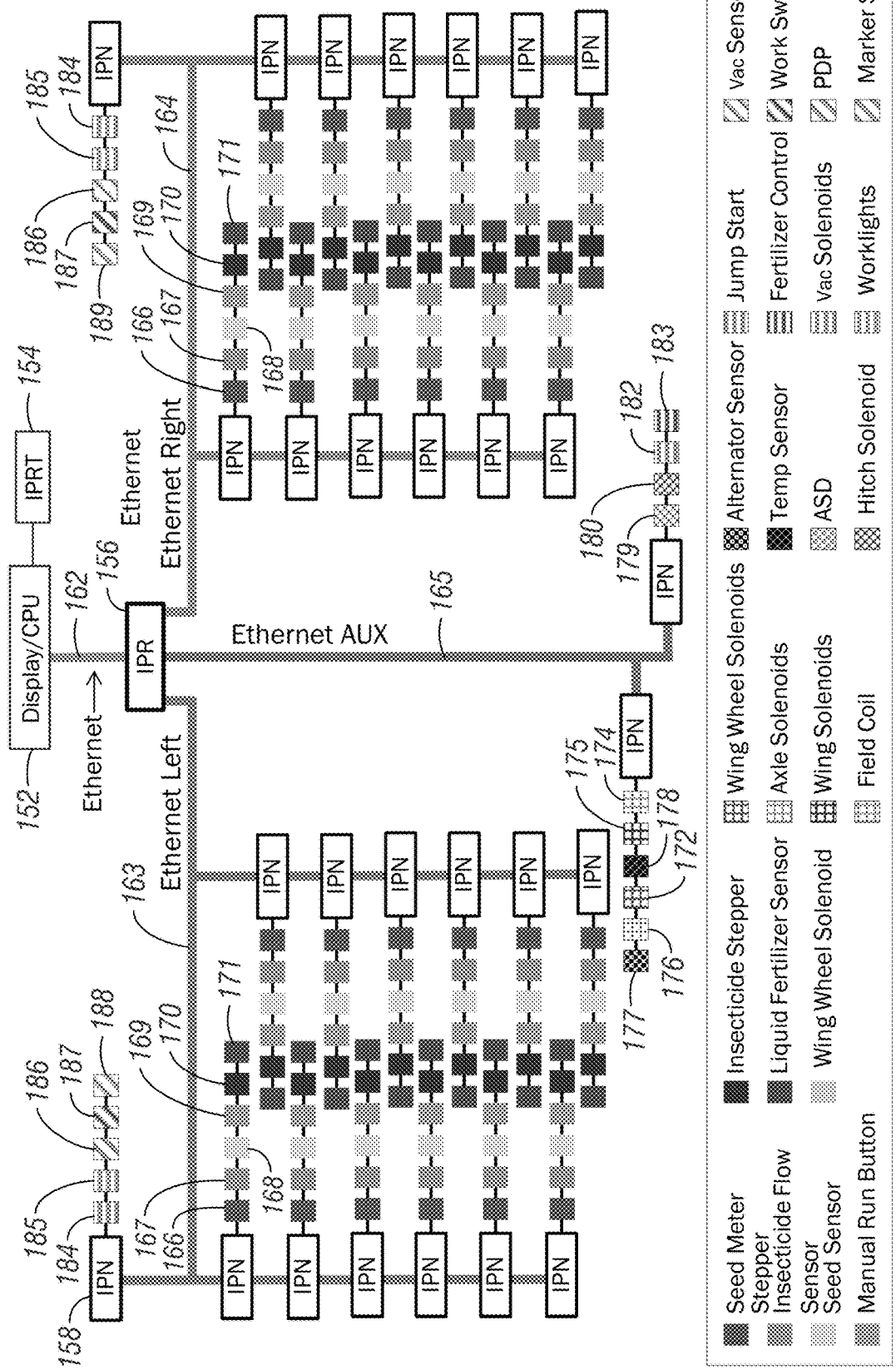
FIG. 5 is another schematic emphasizing further aspects of the implement control system.

FIG. 5 shows another schematic of the implement control system 150 according to aspects of the present disclosure. The schematic shown in FIG. 5 is similar to that shown and described in FIG. 4. For example, the implement control system 150 shown in FIG. 5 includes an intelligent control 152 in the form of a display/CPU member. The display/CPU member is connected to an IPR 154. An Ethernet connection 162 can be utilized to connect the display to the implement IPR 156. The use of Ethernet connection allows for high speed, high band width transmission of information between the components. Ethernet protocol allows for high speed, high speed bandwidth wherein a large amount of data can be transmitted between two components connected via the Ethernet connection in a manner that has not to date been realized in the agricultural industry. Therefore, the use of the Ethernet in the implement control system 150 provides for a much greater transmission in communication of data in a high-speed manner. The IPR is shown to have three Ethernet connections extending therefrom. These include an Ethernet left 163, and Ethernet right 164 and Ethernet auxiliary 165. The Ethernet left 163 connections is showing the Ethernet connection to the left wing of a planter 110, and is shown to be connected to a number of IPNs 158 which are associated with the row units 140 attached to and or on the left wing of the planter. Similarly, the Ethernet right connection 164 is connected to a plurality of IPNs that are associated with a number of row units attached or associated with a right wing of the planter 110. However, it should be appreciated that the number of IPNs 158 utilized and the delegation of the right and left are for exemplary purposes only, and are should not be limiting to the present disclosure. Finally, the Ethernet auxiliary connection 165 is connecting the IPR 156 to a plurality of IPNs 158 associated with auxiliary functions of the planter 110. While two IPNs 158 are connected via the Ethernet auxiliary, it is to be appreciated that this is for exemplary purposes only, and is not to be limiting on the present disclosure either.

Therefore, for exemplary purposes, the Ethernet left connection 163 associated with the IPNs 158 can be described as follows. The IPNs 158 are connected to a number of sensors, motors, and other controls in which the IPNs 158 transmit information between each other and the IPR 156 in order to control functions of the components thereon. For example, one IPN 158 is connected to a seed meter motor 166, insecticide flow center 167, seed sensor 168, manual run button 169, insecticide motor control 170, and liquid fertilizer sensor 171. Such motor and sensors are generally associated with a row unit and/or seed meter of a planter. Therefore, the IPN 158 is connected to the components and operates with the IPR 156 in order to control the functionality of the various components. A different IPN 158 connected to the Ethernet left connection 163 includes connection to vacuum solenoids 184, work lights 185, vacuum sensors 186, work switches 187, and pneumatic down pressure (PDP) 188. Likewise, a different IPN 158 connected to the Ethernet right connection 164 includes connection to vacuum solenoids 184, work lights 185, vacuum sensors 186, work switches 187, and marker solenoids 189. These are also functions associated with the wing and control of components thereon. Therefore, the additional IPN 158 will include connections and control of the functions associated with these components. The Ethernet auxiliary connection 165 is shown to be connected to additional components. For example, the IPNs 158 associated with the Ethernet auxiliary connection 165 include components of wing wheel solenoids 172, axle solenoids 174, wing solenoids 175, field coils 176, alternator sensors 177, temperature sensors 178, air seed delivery controls 179, hitch solenoids 180, jump start controls 182 and fertilizer controls 183. Such controls, sensors, and the like are associated with other aspects of the planter and control thereof. This allows for the use of the planter and the acquisition of data associated with the varying controls.

Therefore, the IPNs 158 are in communication with the IPR 156 to provide the controls for the associated components of the IPNs 158. This will allow for the control of the planter in a higher speed and higher bandwidth manner, such that the controls will be passing a higher amount of data between the IPNs 158 and the IPR 156. Furthermore, the use of the implement control system 150 as shown and described will provide additional benefits and improvements. Such benefits may include a type of plug-n-play system. Currently, each row unit includes a node or control board that is specifically programmed for the location of the row unit in relation to the planter, type of seed meter used with the planter and other factors in which the node is specifically tailored to and tied down to a specific location. Aspects of the present disclosure allow for the IPNs 158 to be near universal and function to allow for the IPN 158 to be connected to an IPR 156 in which the IPN 158 will then become programmed to provide any number of functional capabilities. These functional capabilities can then be transmitted to the user display to allow for an operator to interact with the IPN 158 on how it should act, react or otherwise function in relation to the other components of the implement control system 150.

For example, the IPR 156 can be programmed during manufacture, as previously disclosed. This can include information related to the planter, such as number of row units type of seed delivery mechanism, type of down force providing, type of pressure to the seed meters, and/or any other factors that can be varied according to a planting implement. The IPNs 158 can be attached to the planter wherein the IPR 156 can transmit this information to the IPN 158 via the high speed, high bandwidth Ethernet connections to provide information related to the planter to the IPN 158. The IPN 158 can then recognize other components connected thereto and can provide functional options to an operator via the user display to allow for the operator to input desired outcomes, controls, parameters, or other inputs to allow the IPN 158 to actively control components connected thereto based on said inputs. This quick plug-n-play style programming allows for the IPNs 158 to be essentially un-programmed until connected to an IPR number. The blank programming of the IPN 158 will allow for the quick association of the IPN 158 with components connected thereto to allow for the control of said components regardless of any preprogramming. This is advantageous in that it saves time, cost, and other problems associated with specifically programming a control board with the functionality of components that it will be attached to.

Figure 6:
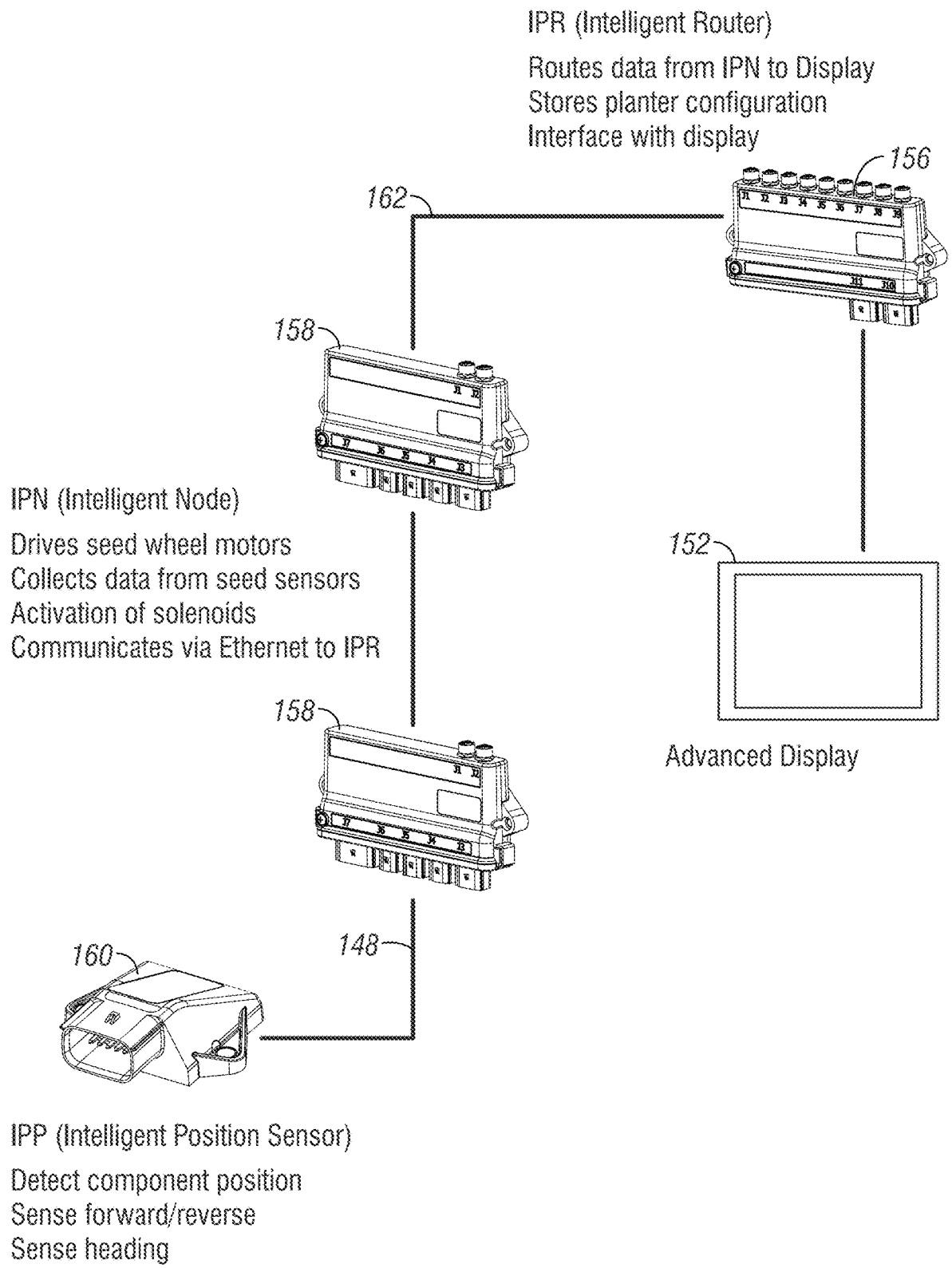
FIG. 6 is a diagram showing components of the implement control system.

FIG. 6 shows another diagram of the implement control system explaining some of the components thereof. As disclosed, an intelligent control 152 can take the form of a tablet, monitor, user interface, or other computing device. As shown in FIG. 6, the display can be a touch screen monitor providing a user interface with inputs and outputs and having an Ethernet input with a mounting bar dock. As mentioned, if the required input and outputs are not associated with a display unit, an IPR 156 or other routing mechanism that does include the desired input and output connectivity can be associated with the display unit. The intelligent control 152 is connected via Ethernet connection 162 to an IPR 156. According to aspects of the disclosure, at least one, or one or more IPRs 156 may be used with each planter. For example, one IPR 156 may be used with a planter according to some embodiments. However, additional embodiments include a planter with more than one IPR 156, such as two, three, or more. IPR route data from an IPN 158 to the display, stores planter configuration information, interfaces with the display, and can provide other controlling or otherwise be the brain function of an implement. Connected to the IPR via Ethernet connection is a plurality of IPNs 158. The IPNs 158 are connected to components of a planter or other mechanism to control said components. For example, the IPNs 158, one connected to a planter, can drive seed motors, collect data from seed sensors, activate solenoids, and or otherwise communicate with the IPR 156 via Ethernet connection. Also shown in the diagram of FIG. 6 is an IPP 160. A plurality of IPP 160 can be positioned throughout the planter to provide positioning data for the planter and components thereof. The IPP 160 can detect component position, sense forward and reverse direction, and otherwise sense heading of the planter and/or components thereof. For example, when an IPP 160 is positioned on a marker 133, 136, the information collected by the IPP 160 can provide substantially exact location of the marker 133, 136 between a stored and a use configuration. This is highly advantageous over the current setting which and only allows knowledge or information that the marker 133, 136 is being lowered or raised, but does not show exact configuration thereof. The IPP 160 can also collect additional information and be an inertial unit that can provide highly accurate location information such that the data can be collected during planting to provide location information related with an event. Such information can be associated with the planting of a seed, the location of an obstacle, the location of start and ending, and generally any other location or directional information that may be associated with an event.

Internal mechanical and electrical components which can, for example, make up the IPR 156, IPN 158, and IPP 160 are described in co-owned pending patent application Ser. No. 15/800,954, which is herein incorporated by reference in its entirety.

Figure 7:
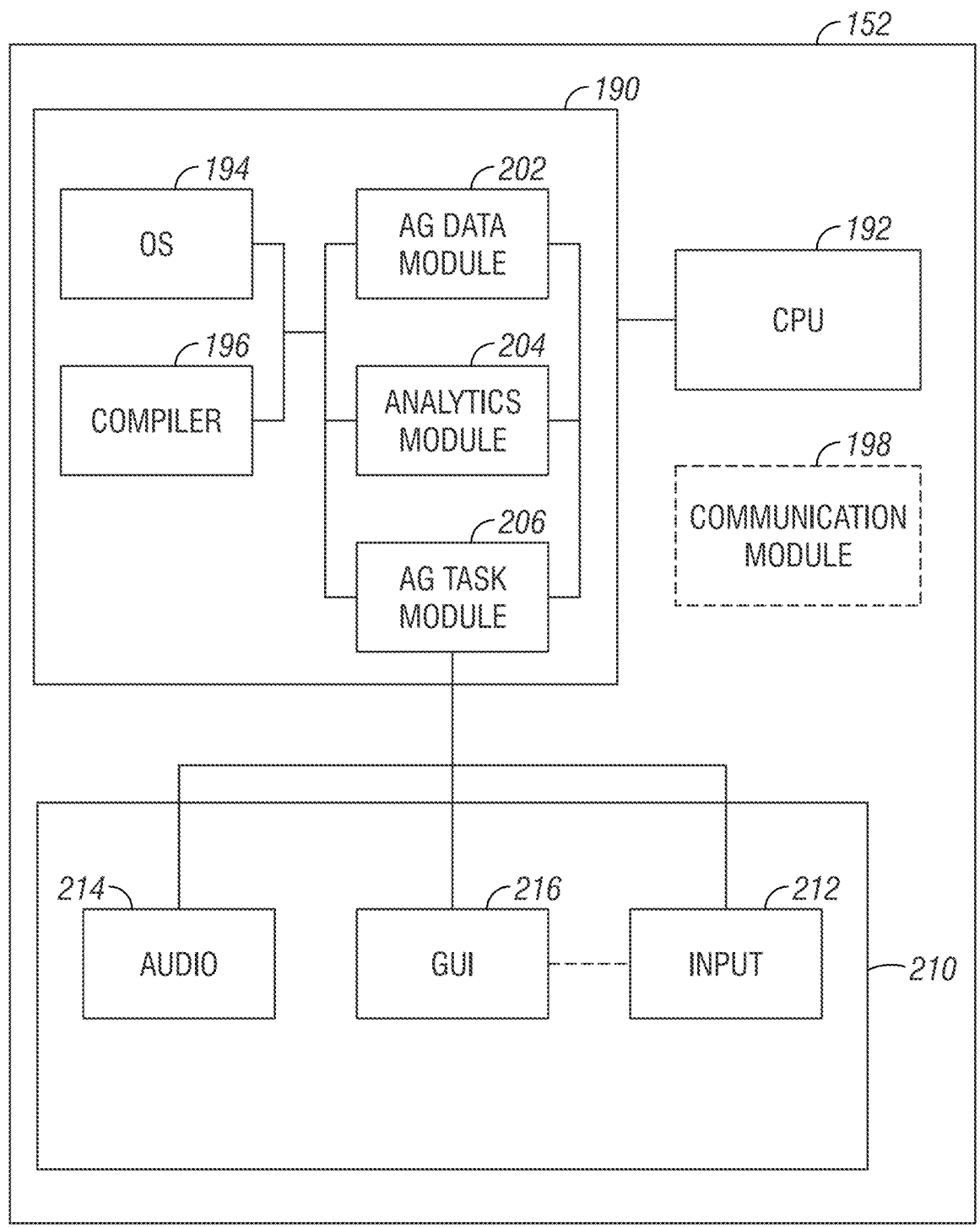
FIG. 7 illustrates, schematically, a hardware environment emphasizing computing components of an exemplary intelligent control, such as a tablet with a touch-screen display.

FIG. 7 illustrates, schematically, a hardware environment emphasizing computing components of an exemplary intelligent control 152, such as a tablet or other type of display unit with a touch-screen display.

The intelligent control 152 includes memory 190, which has a program storage area and/or data storage area. The memory 190 comprises either read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc.

A central processing unit 192, such as a processor, a microprocessor, or a microcontroller, is connected to the memory 190 and is capable of executing software instructions that stored in the memory 190. The central processing unit 192 is the electronic circuit which performs operations on some external data source, such as the memory 192 or some other data stream. The central processing unit 192 performs the basic arithmetic, logic, controlling, and input/output ("I/O") operations specified by the instructions.

As shown in FIG. 7, aspects of the intelligent control 152, including computer hardware and software resources of the modules 202, 204, 206, are managed by an operating system 194 stored in the memory 190. More particularly, a compiler 196 allows a software application written in a programming language such as COBOL, C++, FORTRAN, or any other known programming language to be translated into code to be read by the central processing unit 192. After completion, the central processing unit 192 accesses and manipulates data stored in the memory of the non-transitory computer readable medium using the relationships and logic dictated by the software application and generated using the compiler 196.

In one embodiment, the software application and the compiler are tangibly embodied in the intelligent control 152. When the instructions are read and executed by the central processing unit 192, the intelligent control 152 performs the steps necessary to implement and/or use the present invention. A software application, operating instructions, and/or firmware (semi-permanent software programmed into read-only memory) may also be tangibly embodied in the memory 190, agricultural data module 202, analytics module 204, ag task module 206, and/or data communication devices (e.g., communication module 198), thereby making any software application disclosed herein a product or article of manufacture according to the present invention.

The communications module 198 is capable of connecting the intelligent control 152 to a network 200, such as a cloud-computing network 200A, and/or systems of interconnected networks, such as the Internet 200B. In some embodiments, the intelligent control 152 and/or communications module 198 can include one or more communications ports such as Ethernet, serial advanced technology attachment ("SATA"), universal serial bus ("USB"), or integrated drive electronics ("IDE"), for transferring, receiving, or storing data. In other embodiments, a software licensing and delivery model usable in connection with the cloud-computing network 200A can be software as a service ("SaaS"), infrastructure as a service ("IaaS"), platform as a service ("PaaS"), desktop as a service ("DaaS"), a managed service provider, mobile backend as a service ("MBaaS"), or information technology management as a service ("ITMaaS").

The agricultural data module 202 includes the necessary hardware and/or software components and/or is electrically connected to other computing components such that the intelligent control 152 can more efficiently store, manage, and transmit agricultural data 208.

Figure 8:
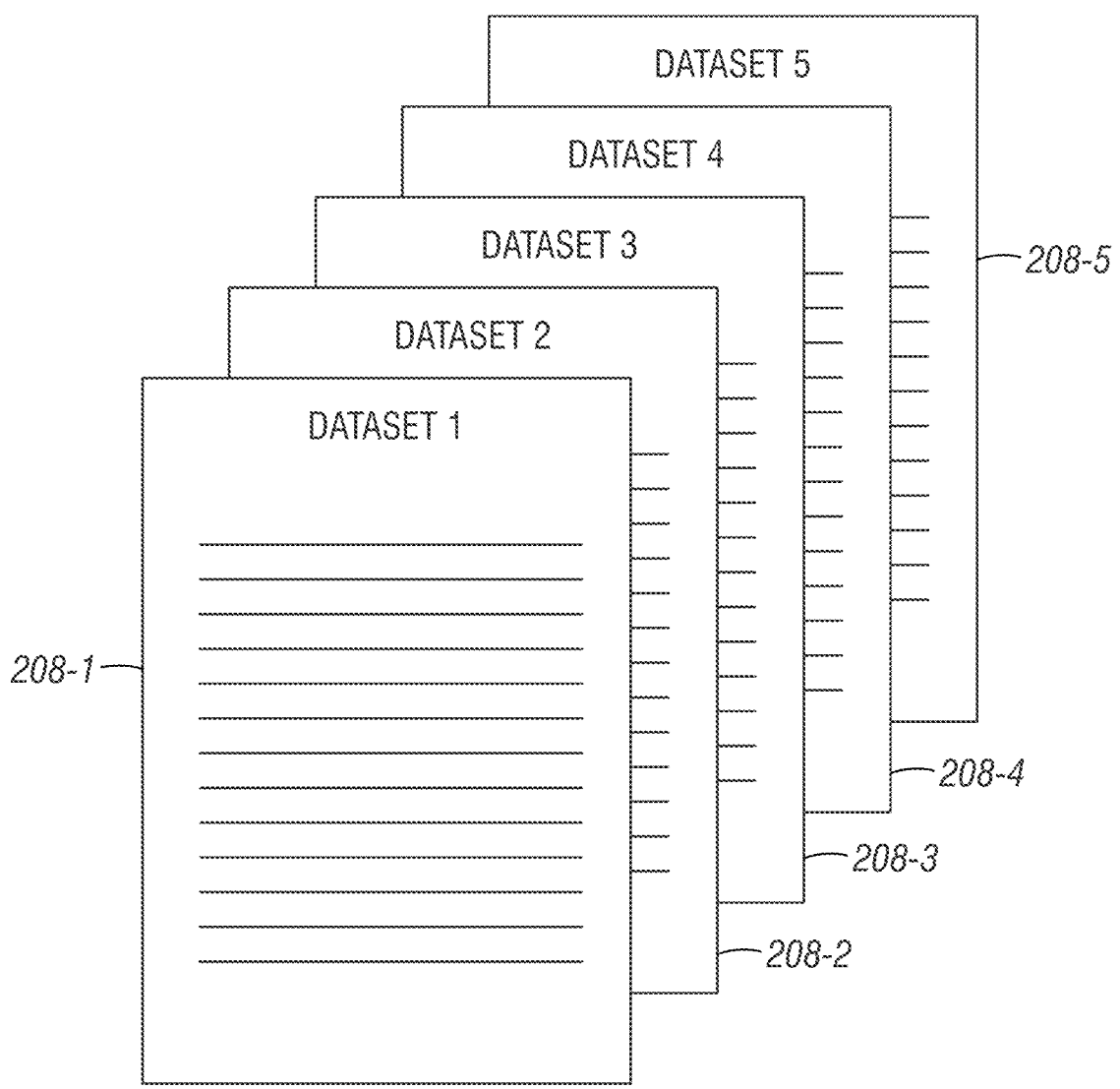
FIG. 8 depicts layered data, including that data which is storable in database(s) and/or accessible by way of an agricultural data module, so as to facilitate viewing, analyzing, and/or performing agricultural tasks with said data.

As shown in FIG. 8, the agricultural data 208 can be categorized and/or separated into layers 208-1 . . . 208-N. For example, a first layer 208-1 of the agricultural data 208 can comprise planting information such as (a) an instruction to plant or not to plant; (b) seed and/or fertilizer type; (c) seed spacing; and (d) depth of planting. For example, a second layer 208-2 of the agricultural data 208 can comprise planting efficiency information such as (a) singulation (including skips and/or doubles); (b) fertilizer rates; and (c) population rates. For example, a third layer 208-3 of the agricultural data 208 can comprise time and/or weather forecast information such as (a) time of day; (b) air temperature; (c) season; and/or (d) a weather condition. For example, a fourth layer 208-4 (not shown) of the agricultural data 208 can comprise vehicle information such as (a) heading, such as a direction or bearing, of the implement and/or tow vehicle; (b) velocity or speed of the implement and/or tow vehicle; (c) fuel level of one or more fuel tanks on the implement and/or tow vehicle; and/or (d) technical capabilities of the implement and/or tow vehicle. For example, a fifth layer 208-5 (not shown) of the agricultural data 208 can comprise soil information such as (a) moisture content; (b) compaction; (c) ground temperature; (d) elevation; (e) depth; (f) slope of terrain; and/or (g) soil composition. Symbols and/or values for the agricultural data 208 can be displayed via graphical user interface 216 (as particularly shown in FIGS. 14-16). The agricultural data 208 can be designated as historical data, temporary data, live data, anticipated data, predictive data, or the like.

Figure 9:
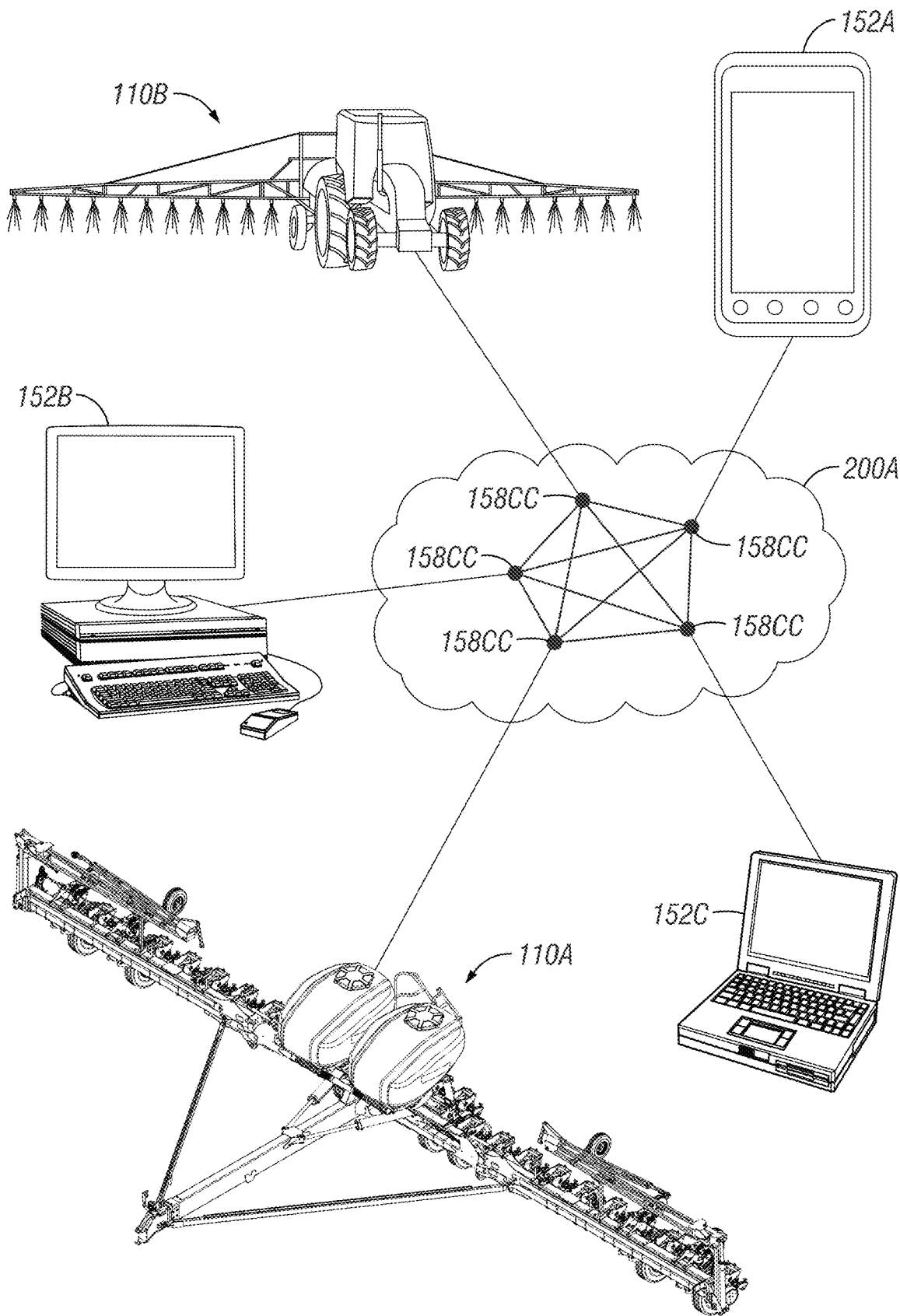
FIG. 9 exemplifies a cloud computing environment.
Figure 10:
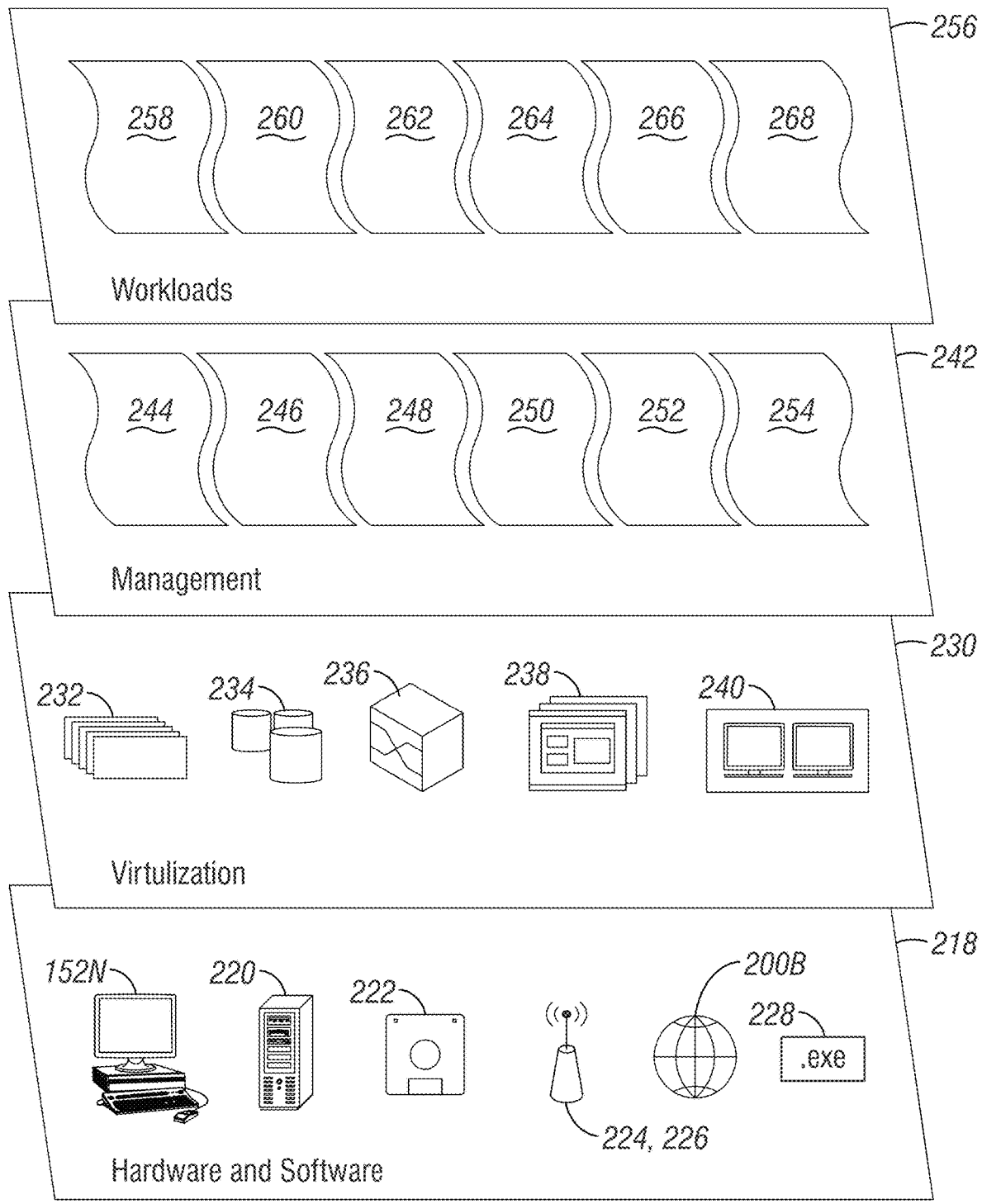
FIG. 10 exemplifies a cloud computing node.

Referring back to FIG. 7, the agricultural data module 202 can work in tandem with the memory 190 to store and/or access the agricultural data 208. The agricultural data module 202 can also work in tandem with the communication module 198 to communicate agricultural data 208 among several different computing devices 152A-152N, which can be located on remote agricultural implements 110, and even across agricultural implements of varying types 110A-110N, as shown in FIG. 9. The agricultural data module 202 can also work in tandem with the communication module 198 to communicate agricultural data 208 among several distinct networks 200, as shown in FIG. 10. A non-exhaustive list of exemplary networks include: a wide area network ("WAN") such as a TCP/IP based network or a cellular network, a local area network ("LAN"), a neighborhood area network ("NAN"), a home area network ("HAN"), and a personal area network ("PAN"). Some networks 200 will allow communication between the communication module 198 and the central location during moments of low-quality connections. Communications through the networks 200 can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

For example, and with respect to FIG. 9, an illustrative cloud computing environment 200A includes one or more cloud computing nodes 158CC with which local computing devices used by cloud consumers. The computing devices can include, for example, personal digital assistant ("PDA") or cellular telephone 152A, desktop computer 152B, laptop computer 152C, and/or any suitable other type of computer systems 152N. Cloud computing nodes 158CC will communicate with one another and may be grouped physically or virtually, in one or more networks, such as private, community, public, or hybrid clouds as described hereinabove, or a combination thereof. This allows cloud computing environment 200A to offer infrastructure, platforms and/or software as services for which a cloud consumer does not need to maintain resources on a local computing device. It is understood that the types of computing devices 152A-N shown in FIG. 9 are intended to be illustrative only and that computing nodes 158CC and cloud computing environment 200A can communicate with any type of computerized device over any type of network and/or network addressable connection (e.g., using a web browser). In other words, the present disclosure non-limitingly refers to a cloud-based server; a mesh network and/or direct wireless connected device could also be employed in addition to the cloud-based server or in lieu thereof.

For example, a mesh network can allow a higher number of nodes 158CC (i.e. bridges, switches, and other infrastructure devices) to connect directly, dynamically and non-hierarchically to as many other nodes 158CC and to cooperate with one another to efficiently route data from/to clients. This lack of dependency on one node 158CC allows for every node 158CC to participate in the relay of information. Mesh networks dynamically self-organize and self-configure, which can reduce installation overhead. The ability to self-configure enables dynamic distribution of workloads, particularly in the event a few nodes 158CC should fail. This in turn contributes to fault-tolerance and reduced maintenance costs.

Referring now to FIG. 10, a set of functional abstraction layers provided by cloud computing environment 200A (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 218 includes hardware and software components. Examples of hardware components include: implement computing devices 152N; servers 220; storage devices 222; networking components, including network towers 224 and network signals 226; network connections, including those to the Internet 200B; and software components 228, including network application server software and database software. Network signals 226 can employ any of a variety of communication protocols, such as Wi-Fi, Bluetooth, ZigBee, near field communication ("NFC"), etc., although other types of network signals 226 are possible and are contemplated herein.

Virtualization layer 230 provides an abstraction layer from which the following examples of virtual entities may be provided: virtual servers 232; virtual storage 234; virtual networks 236, including virtual private networks; virtual applications and operating systems 238; and virtual clients 240.

In one example, management layer 242 may provide the functions described below. Resource provisioning 244 provides dynamic procurement of computing resources and other agricultural resources that are utilized to perform tasks within the cloud computing environment. Finances 246 provide cost tracking as computing and agricultural resources are utilized during operation of an agricultural implement and connected or related computer systems. In one example, these resources may include application software licenses. Security 248 provides identity verification for cloud consumers and tasks, as well as protection for data and other resources. User portal 250 provides access to the cloud computing environment for consumers and system administrators. Service level management 252 provides cloud computing resource allocation and management such that required service levels are met. Service level agreement ("SLA") planning and fulfillment 254 provide pre-arrangement for, and procurement of, cloud computing resources for which a future requirement is anticipated in accordance with an SLA.

Workloads layer 256 provides examples of functionality for which the cloud computing environment 200A may be utilized. Examples of workloads and functions which may be provided from this layer include: mapping and navigation 258; software development and lifecycle management 260; troubleshooting 262; data analytics processing 264 via analytics module 204; agricultural task processing 266; and a workload 268 to provide access to databases and nomograms to facilitate the computation and/or other handling of agricultural data. For example, the workload 268 may provide an application programming interface ("API") to obtain information relating to those risks which may delay, prevent, or nullify efficient planting.

The agricultural data module 202 can also work in tandem with an analytics module 204 and/or user interface 210 to create more agricultural data 208, manipulate existing agricultural data 208, and/or display agricultural data 208.

The analytics module 204, in particular, can facilitate (i) amalgamation; (ii) separation, (iii) calculation, (iv) prediction, (v) instruction relating to agricultural tasks, (vi) comparisons, (vii) conversions, (viii) designation, (ix) reevaluation, (x) replacement, and/or (xi) deletion: of/with agricultural data 208. The analytics module 208 can perform such functions automatically in response to receiving agricultural data 208 or after a user prompts the analytics module 204 to perform a specific function.

The user interface 210, in particular, is how the user interacts with the intelligent control 152 and modules contained therein. The user interface 210 can be a digital interface, a command-line interface, a graphical user interface ("GUI") 216, any other suitable way a user can interact with a machine, or any combination thereof. For example, the user interface 152 can include a combination of digital and/or analog input/output devices or any other type of input/output device required to achieve a desired level of control and monitoring of the agricultural data 208 and/or agricultural tasks. Input(s) received from the user interface 210 can be sent to a microcontroller to control operational aspects of the intelligent control 152. Examples of input devices 212 include computer mice, keyboards, touchscreens, knobs, dials, switches, buttons, microphones, cameras, voice recognition software commonly used in virtual assistants, etc. Examples of output devices include audio speakers 214, displays for graphical user interfaces 216, light emitting diode (LED) indicators, etc. In at least one embodiment, graphical user interfaces 216 are capable of displaying agricultural data 208 sensed in real-time on a map.

Figure 11:
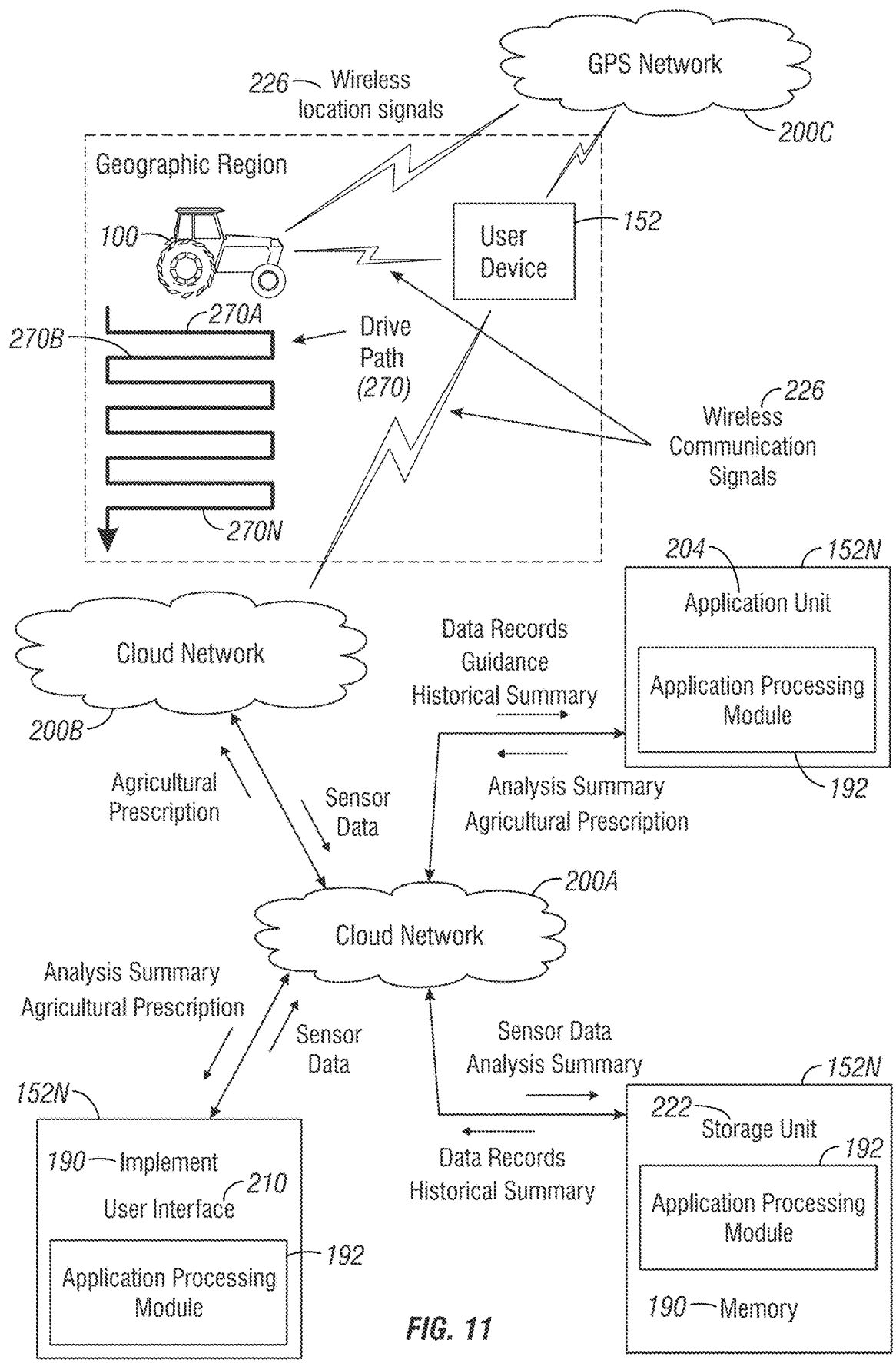
FIG. 11 illustrates the communication of information, such as a drive path, for an associated geographic region.

FIG. 11 illustrates, for exemplary purposes only, a computerized system that can connect to a global positioning system (GPS) network 200C to enhance mapping and navigation 258 of a navigation system located an agricultural implement 110. GPS is owned by the United States and uses satellites to provide geolocation information to a GPS receiver. GPS, and other satellite-based radio-navigation systems, can be used for location positioning, navigation, tracking, and mapping.

More particularly, computerized information including that which represents an actual drive path 270 for an associated geographic region 272 can be communicated among several intelligent controls 152 in remote locations. The tractor 100 and/or agricultural implement 110 can be located within the geographic region 272.

The tractor 100 and/or agricultural implement 110 determine location information based on receiving wireless location network signals 226 from a GPS network 200C and captured sensor data (e.g., farming tractor accelerometer data, soil moisture levels, soil chemical content, etc.) along the drive path 270 for at least a portion of the geographic region 272. The drive path 270 includes a geographic path of the tractor 100 and/or agricultural implement 110 when operating within the geographic region 272. The drive path may include two or more sub-drive paths 270A-270N. For example, a first sub-drive path 270A traverses the geographic region 272 from left to right and a second sub-drive path 270B traverses the geographic region 272 from right to left. The intelligent control 152 of the tractor 100 and/or agricultural implement 110 may monitor the drive path 270 (e.g., passively monitoring along a path taken by the tractor 100 and/or agricultural implement 110) or may provide the drive path 270 (e.g., where an agricultural prescription includes control information to invoke operation of the tractor 100 and/or agricultural implement 110 along the drive path 270). The drive path 270 may be obtained by the intelligent control 152 in a variety of ways including one or more of determining a specific drive path in accordance with the agricultural prescription, utilizing a predetermined drive path (e.g., the drive path for geographic region 272 from a list), generating a random drive path, utilizing a previous drive path associated with geographic region 272 (e.g., obtaining a historical summary), and receiving the agricultural prescription that includes control information associated with the drive path 270. For example, the intelligent control 152 can utilize the drive path 270 from the agricultural prescription while a tractor 100 and tiller 110C are tilling the soil of at least a portion of the geographic region 272.

Having captured the sensor data, the intelligent control 152 and communications module 198 located therein can send, using, for example, Bluetooth wireless communication signals, the captured sensor data to the agricultural implement 110. The intelligent control 152 and communications module 198 located therein can also send, utilizing, for example, long-term evolution ("LTE") wireless communication signals, the captured sensor data via the Internet 200B to a cloud-based network 200C (other networks are possible) with a cloud-based storage unit 222. The central processing unit 192 associated with the intelligent control 152N of the cloud-based storage unit 222 processes the captured sensor data to produce data records for storage in the memory 190 of the cloud-based storage unit 222. Alternatively, a removable memory of the intelligent control 152N is utilized to temporarily store the captured sensor data. The removable memory is operably coupled to the cloud-based storage unit 222 to facilitate transfer of the captured sensor data to the central processing unit 192 of the cloud-based storage unit 222. For example, the removable memory device is directly interfaced to the cloud-based storage unit 222. As another example, the removal memory device is interfaced to the tractor 100 and/or agricultural implement 110. The intelligent control 152 of the tractor 100 and/or agricultural implement 110 facilitates sending, via the networks 200, the captured sensor data to the cloud-based storage unit 222.

The intelligent control 152 of the tractor 100 and/or agricultural implement 110 can receive via user input devices 212 a request for an analysis and generation of an agricultural prescription. The central processing unit 192 and data analytics module 204 of the same or another (as shown at the right of FIG. 11) intelligent control 152 generate guidance based on the request and other desired characteristics (e.g., a crop list, a time frame, equipment availability, chemical availability, and soil management operational ranges available) of the agricultural prescription for the geographic region 272. The intelligent control 152 sends, via the networks 200, the guidance to the agricultural implement 110. The central processing unit 192 of the agricultural implement 110 obtains the data records for the geographic region 272 from the cloud-based storage unit 222 based on the guidance. The central processing unit 192 and agricultural data module 204 may further obtain historical summaries with regards to the geographic region 272 based on the guidance.

Having obtained the guidance, the data records, and/or the historical summaries, the central processing unit 192 and data analytics module 204 of the intelligent control 152 produce an analysis based on the data records and/or the historical summaries. The central processing unit 192 and data analytics module 204 of the agricultural implement 110 processes the analysis in accordance with the guidance and/or the historical summaries to produce an analysis summary. The agricultural data module 202 of the intelligent control 152 associated with the agricultural implement 110 facilitates storage of the analysis summary by the cloud-based storage unit 222 to enable subsequent recovery of the historical summaries that includes the analysis summary.

Having produced the analysis summary, the central processing unit 192 and analytics module 204 of the intelligent control 152 process the analysis summary in accordance with the guidance and the historical summaries to produce the agricultural prescription. The agricultural prescription may further include a plurality of agricultural related tasks, where each step includes one or more agricultural tasks, and for each agricultural task, one or more required preconditions to execute the agricultural task. Such steps may be executed by the central processing unit 192 and agricultural task module 206 in parallel, in series, and in a combination in accordance with the preconditions for execution. The agricultural task to be performed an agricultural task can be any one or more of the following: (a) planting; (b) tilling; (c) baling; (d) harvesting; (e) spraying; (f) transporting; (g) cultivating; (h) harrowing; (i) plowing; (j) fertilizing; (k) broadcasting; (l) loading; and (m) unloading.

The preconditions for execution of the agricultural task includes required conditions to enable execution of the agricultural task (e.g., when to execute the agricultural task) including one or more of a current date match, a current date within a date range, a time within a time range, a current data sensor value within a desired range (i.e., a current temperature within a temperature range), an actuator readiness state, distance from a previously executed step (i.e., seed dispensing population of seeds per acre), and elapsed time since a previously executed step). For example, a precondition for planting a short growing seed at a later date has occurred within a growing season.

Each agricultural task includes what to do and how to accomplish the agricultural task. As such, some agricultural tasks will include dispensing seed and/or other materials (i.e., a gas, a liquid, a slurry, a solid), how to dispense the material (i.e., distance between dispensing points, distance between parallel dispensing tracks), collect sensor data, and manipulate other objects (e.g. management practices including: performance of other agricultural tasks, avoiding obstructions, irrigation control, sunlight control, etc.). Liquids can include chemical compounds such as fertilizers and pesticides. The pesticides include one or more of insecticides (e.g., insect killers), herbicides (e.g., weed killers), and fungicides (e.g., to kill or inhibit fungi). The solids include one or more of seed, fertilizer powder, and manure. The seeds include a plurality of hybrid seed types and may vary from growing season to growing season.

Figure 12:
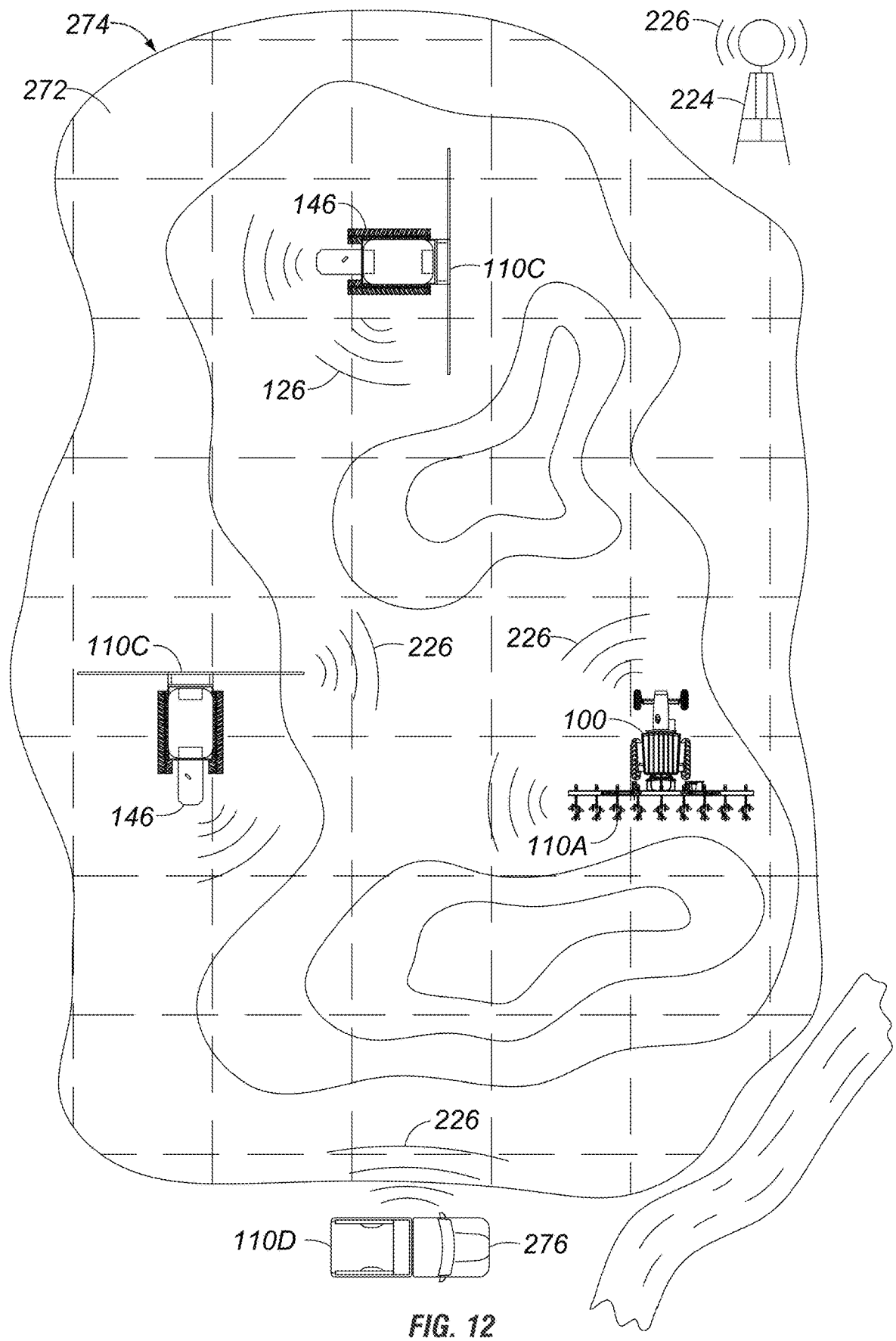
FIG. 12 shows multiple planters operating in a field with the field parsed into geographic regions.

FIG. 12 is a schematic diagram showing multiple units in a field 274. As shown in FIG. 12, a field 274 may include a first tug unit 146 attached to a first tiller 100C, a second tug unit 146 attached to a second tiller 100C, and a tractor 100 attached to a tractor planter 110A. Furthermore, there can a truck 276 towing a storage bin 100D shown outside the field 274. The first and second tug units 164, as well as the tractor 100 are performing an operation within the field. The use of the multiple vehicles in the field at the same time will reduce the amount of time to complete the operations.

In order to ensure that tractors 100, tug units 146, and/or a truck 276 do not overlap one another or otherwise run into one another, the vehicles emit network signals 226, which can be communicated and transmitted between each other. The network signals 226 can include a vast amount of information. For example, the network signals 226 can communicate the location of the units relative to one another as well as relative to the location in the field 274. The network signals 226 can also communicate any alerts, warnings, status updates, or other actions that may be occurring. For example, alerts can be sent where a unit is low on material, a unit is damaged, an obstruction is detected, a general status of soil conditions, trash build up, weed concentration, and/or the like is updated, etc.

Furthermore, FIG. 12 shows a tower 224 emitting a network signal 226. The tower 224, which could be one of many towers around the field, can provide additional location determining aspects for the field 274. The height and/or position of the tower 224 may increase the efficiency of the communication between the actors in the field. The tower 224 can also communicate to another field or to a master module located at a different location as to the status, alerts, warnings, or other data obtained by the vehicles in the field. In addition, it is contemplated that the agricultural data 208 from the network signals 226 can be stored for future purposes. For example, as the units operate in the field 274, they can obtain data, such as field conditions to prepare future planting schedules and/or maps.

Figure 13:
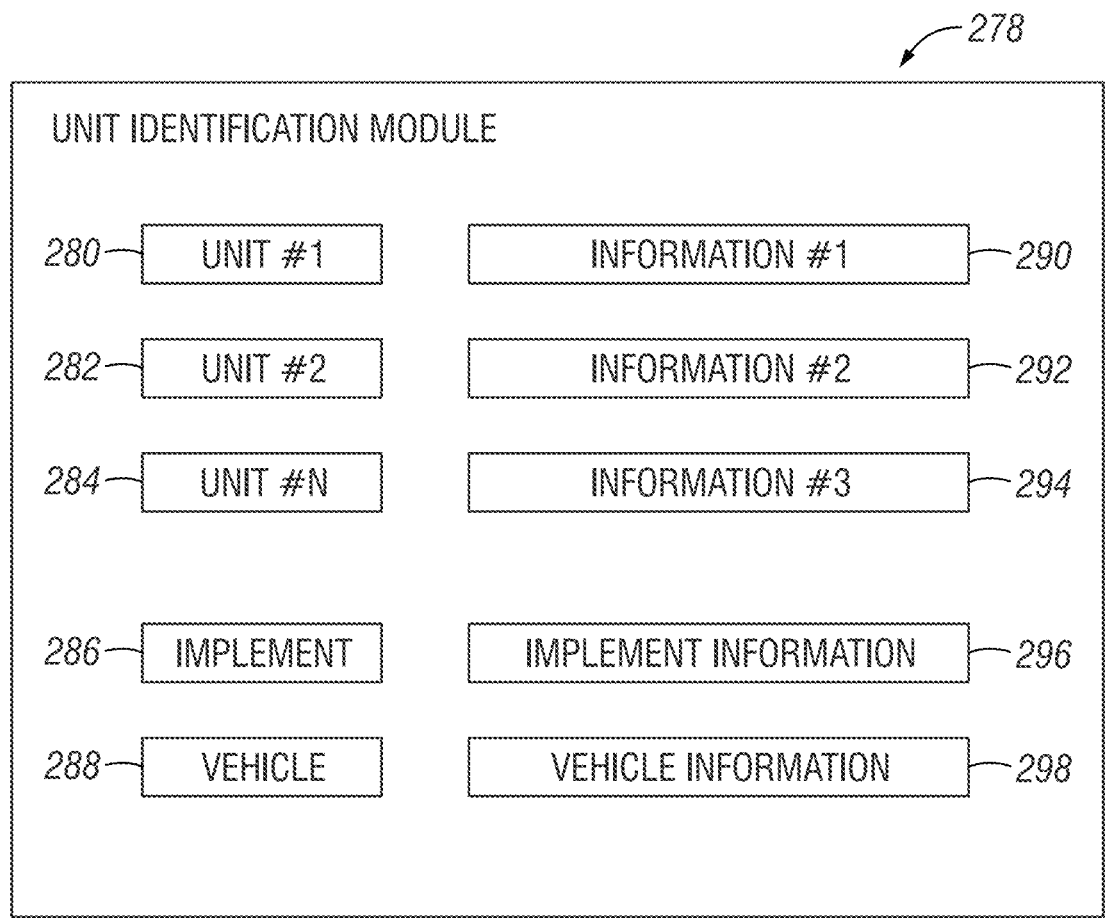
FIG. 13 is a diagram of a master module for use with an agricultural system having several agricultural implements, vehicles, and/or units.

FIG. 13 is a diagram of an example of a unit identification module 278 for use with the system including multiple vehicles and/or units, such as those disclosed in FIG. 12. The unit identification module 278 can be located on the tractor 100 of FIG. 1 and/or included with the intelligent control 152 of FIG. 7. The unit identification module 278 shown includes information for identifying the units. For example, in FIG. 13 the unit one identifier is shown in box 280, unit two is shown in box 282, and unit N is shown in box 284, where N is used to indicate the total (any) number of units in the field 274. Implement identification for the tractor containing the unit identification module 278 can be shown in box 286 and vehicle identification can be shown in box 288. Information for each of the units can be shown in boxes 290, 292, 294, 296, 298. Such information may include, but is not limited to, the status of the unit and/or implements connected thereto, location of the units, alerts or warnings associated with the units, field conditions, seed conditions, or the like. Such information may include the rate of planting, the amount of down force provided for each implement, the soil conditions, seed conditions, amount of remaining material, type of spraying, amount of spraying, moisture content, or generally any other type of information that may be useful for any of the agricultural based operations, as disclosed. In addition, the information boxes may include warnings or alerts that can flash or otherwise provide notice to the unit identification module 278. The amount and type of information disclosed in the unit identification module 278 is generally limitless. Furthermore, the unit identification module 278 or the system in general may include memory for storing data. The data could be recalled by the unit identification module 278, such as in a future planting or harvesting year to indicate choices or other information.

Safety elements can be included, such as redundant and independent safety systems that prevent the units from colliding and/or double planting areas in the field 274. These can include, but are not limited to, vehicle-mounted emergency stop buttons, safety handheld remotes, autonomous lockout, as well as other lockout mechanisms. For example, a battery-powered, safety handheld remote transmitter can be provided with each unit. The safety handheld remote includes an emergency stop button that allows an operator to perform an emergency stop remotely over a limited distance, as long as the remote is within communication range of the tractor 100. The safety handheld remote emergency stop button halts only the unit controlled by the remote. A run/pause switch that switches the units between autonomous and manual (non-autonomous) operation can also be included in embodiments where autonomous units are used.

Figure 14:
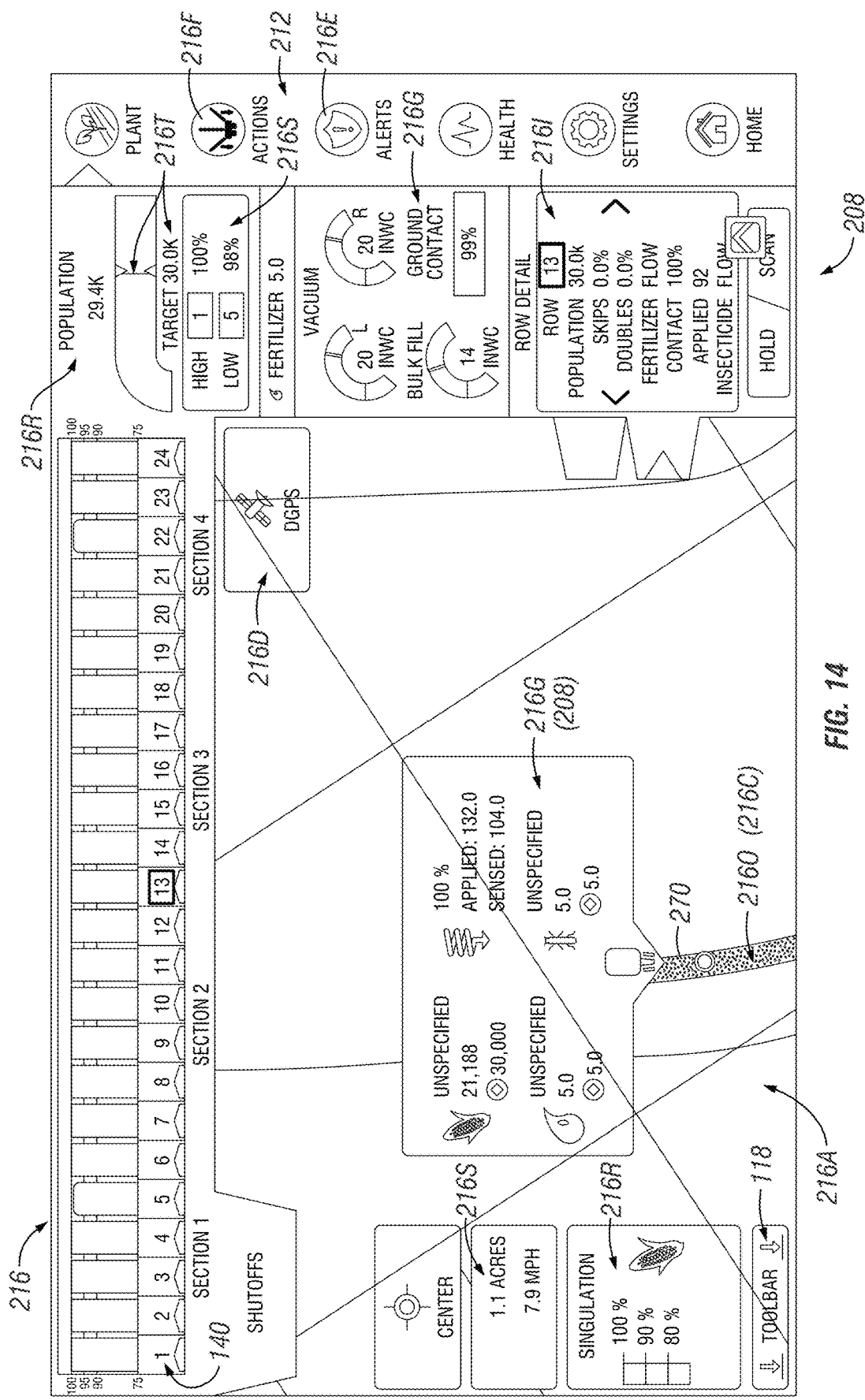
FIG. 14 displays a graphical user interface depicting a mapped view of a planter moving through a field.
Figure 15:
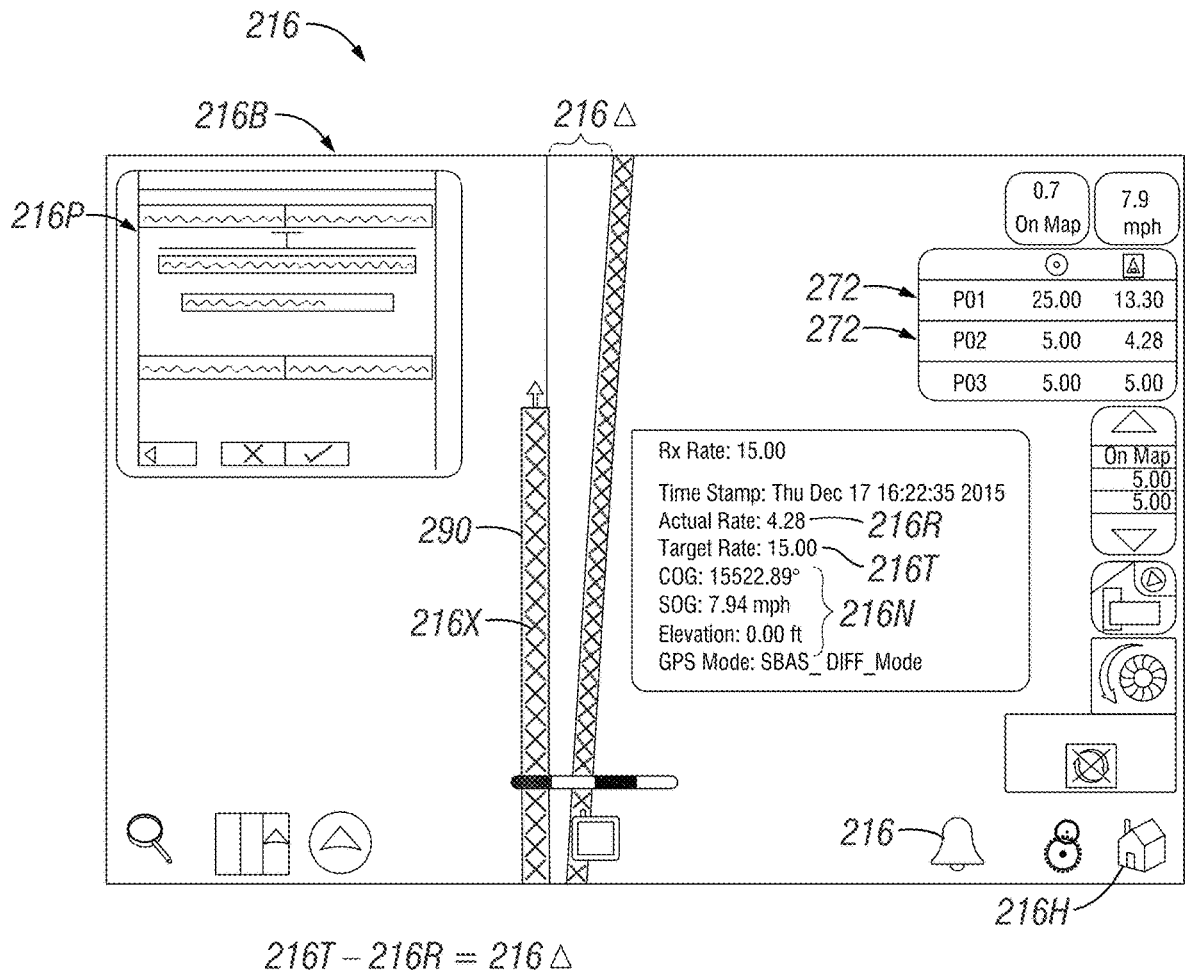
FIG. 15 displays a graphical user interface depicting a detailed view of detailed information, such as actual planting rate, juxtaposed with an expected information, such as a goal planting rate, thereby suggesting an error has occurred.

Using the technical components of FIGS. 1-13, the present invention is thus able to provide an operator of an agricultural vehicle with a more facile user experience, said experience perhaps being best exemplified by the various illustrations of FIGS. 14-15 and aspects of the graphical user interface 216. In some embodiments, the operator is only prompted (or even able) to provide input for agricultural tasks where it is highly desirable and/or necessary.

For example, as the operator travels via tractor 100 through a field 274, the user is able to view time-stamped, geospatial agricultural data 208 in real-time, preferably by way of a user-machine interface, such as a touch-screen display. In some embodiments, the touch-screen display and the intelligent control 152 are one in the same, and thus the touch-screen display can be said to comprise the processor 192, memory 190, operating system 194, compiler 196, and communications module (transmitter/receiver) 198.

As a result, the touch-screen display itself is the control unit capable of employing at least one communication protocol (e.g. ISOBUS, IP+Ethernet combination) and connecting to a network 200. In other embodiments, they are separate, computerized devices.

Ethernet can be preferred over ISOBUS in situations where bandwidth is a concern. For those touch-screen displays utilizing Ethernet, some can also be configured so as to employ the use of Power over Ethernet (PoE), Wi-Fi, Universal Serial Bus (USB), and any of the other previously mentioned aspects of the present disclosure. These features, especially when considered in combination, can, but are not always required so as to, prove critical for enhancing functionality of any control system.

In agricultural systems where the agricultural implement is towed by another vehicle, the touch-screen display will preferably be positioned in the cab 101. However, this need not always be true. For example, in some systems, it may be preferred to locate the intelligent control 152 closer in proximity to a majority of the sensors of the agricultural system, which may or may not be located near the cab 101.

Still further, the user interface, which may be the touch-screen display, can be remote of the implement and the tow vehicle (tractor). For example, the interface could be a handheld, such as a phone or tablet, or could be a touch or non-touch interface in the form of a computer or the like. The same functionality could be provided no matter the location of the interface.

As shown in FIG. 14, a mapped view 216A shows paths recently worked, such as by way of an agricultural operation (e.g. tilled, planted, fertilized, sprayed, harvested, mowed, etc.) by the agricultural implement 110. If an operator, such as a farmer, wishes to view a more detailed view of a portion of the map and/or more detailed numerical and textual information associated with the agricultural data 208, he or she can interact with (e.g., touch) the portion of the touch-screen interface which corresponds to the same.

Aspects of the mapped view 216A can be magnified by way of a separate, detailed view, such as the detailed view 216B shown in FIG. 15. Alternatively, enlarge/minimize functions and page zooming functions, such as those used in other common computer software applications, can be employed so as to provide the ability to zoom in and out of a document or image. This can be in various forms, including, but not limited to pinch to zoom, double tap to zoom, toggle/slide a zoom bar, or even inputting a zoom level. These features will improve accessibility to critical aspects of the agricultural system during agricultural operations, and will substantially help those operators with visual impairment and/or operators that prefer to rely on the use of personal electronic devices with relatively small screen. Such exemplary magnification functions and alternatives to the same are discussed in more detail with reference to FIGS. 17A-D.

To that end, the intelligent control 152/touch-screen display will preferably include a recording module and/or other aspects which allow for the capture of screenshots and screencasts of the graphical user interfaces 216A/B. Such captured images and/or videos can be subsequently communicated to another computing device, such as a mobile phone or a remote master module. These other computing devices can even be configured to (i) display, mirror, or cast what is being shown on the touch-screen display in real-time; (ii) substantially control; and/or (iii) act as a means of input for the intelligent control 152. Such configurations can include wired (e.g., High-Definition Multimedia Interface ("HDMI")) and/or wireless connections.

In other words, the mapped view 216A of FIG. 14 shows high-level generic information 216G used to monitor and display almost all relevant data 208 related to an entire agricultural operation and/or those relevant aspects relating to agricultural characteristics which are being sensed and/or communicated in substantially real-time.

To the extent individualized information 216I for one component and/or operation is included within the mapped view 216A, such individualized information 216I is preferably manually customizable and/or selectable, such that an area of the screen is reserved for what an individual operator and/or farmer believes is most useful or desired for display with relate to the agricultural task at hand. For example, if a farmer knows his or her $13^{th}$ row unit is at risk of erroring during planting operations, he or she may choose to provide some details as to the operation of the same, as shown in FIG. 14. If during the operation the farmer wishes to monitor operation of a different unit, the farmer can select via the touch-screen interface a different row unit 140 from the row units 140 located toward the top of the screen. Thus, in preferred embodiments, the farmer is given an ability to easily navigate between rows to see performance of the row and/or nearby rows. Information of an adjacent row may be inferred or calculated from information related to other rows and/or other types of data (e.g. an adjacent row's position can be triangulated from where the next row's position might be based on current position/heading/etc.).

To increase utility to the farmer operating the machine, in some embodiments it is to be appreciated the farmer will be given the ability to capture and note a point of interest in the field 274. This allows tying something worth noting in the field to the geographic position and agricultural data 208. For example, a farmer may note a rock to avoid when harvesting, a washout where crop yields may not be what was expected, or anything else the farmer way want to track and add to the geospatial metadata.

The generic information 216G will preferably include a mixture of statistics 216S, targets/thresholds 216T, data corresponding to actual rates/realizations 216R such that it provides a most informative picture of the overall agricultural operation. In other words, the generic information 216G should convey to an operator that vital aspects of the agricultural operation are being monitored and communicated in a timely manner to said operator.

In stark contrast, the detailed view 216B of FIG. 15 is especially useful in viewing numeric, textual, and/or detailed information related to a small subsection of a geographic region 272, so as to more immediately identify errors and so as to better compare actual data and/or rates 216R with expected data, targets, and/or thresholds 216T, highlighting differences 216Δ between the two. In other words, FIG. 15 conveys significantly more information than use of a standard zooming feature (e.g. examples of which are explained in more detail with reference to FIGS. 17A-B): agricultural data 208 is being automatically selected and/or optimized for view as a result of algorithmic calculation(s), manipulated, and/or otherwise transformed such that resulting differences and comparisons 216A can be immediately and seamlessly used so as to improve an ongoing or future agricultural operation.

With reference to a more specific example, the detailed view 216B of FIG. 15 has determined slight differences 216Δ in an actual path of travel 270 (left) and an expected path of travel (right), can map the same on the display, and juxtapose numeric, textual, and/or other detailed information 216N associated with heading, velocity, and other agricultural data which are particularly useful for path planning and execution. The comparisons and differences in the detailed view 216B need not even rely in theory (e.g., employ the use of targets and/or thresholds 216T). Rather, it should be understood that the concept of these differences 216Δ extends even to differences between actual results and rates 216R of similar agricultural operations conducted consecutively or simultaneously, and can even include comparisons which rely on data for agricultural operations, even those which are dissimilar, in other regions 272 (e.g. P01, P02, P03). Where errors are occurring in many remote regions 272 at once, this may suggest the errors are nature driven (e.g. originating from a poor weather condition, such as too much or too little humidity).

If aspects are normal or ideal, a color indicator 216C can be used to identify area(s) of normal operations 216O. For example, a green color can be used (indicated in FIG. 14 with the dot-style hatching). Likewise, if an aspect of the agricultural operation becomes inefficient or otherwise errors, the color indicator 216C can likewise be used to identify area(s) of errors 216X. For example, a red color can be used (indicated in FIG. 15 with the cross-style hatching). Other colors (e.g., blue) can be used to denote area(s) of normal operations 216O, errors 216X and/or area(s) falling somewhere therebetween. In some agricultural and/or computerized systems, careful note must be taken to distinguish targets from thresholds, whereas in other computerized systems, such distinctions are of less importance, less significant (e.g., where the difference between a target value and a threshold is minimal), or non-existent (e.g., where the target is identical to the threshold). In some of such systems, intermediate colors (i.e. yellow, orange) can be utilized by the color indicator 216C. Such intermediate colors are particularly well suited to indicate to persons an area being planted is trending toward an outright error but might be otherwise considered satisfactory, such as those results which lie above a threshold value but below a target value (or conversely, where going over a threshold value causes error, the value lies below the threshold but still above the target).

So that the user can gauge whether aspects of the system are outright unavailable (e.g., GPS, Internet connectivity, etc.), there can exist a visual status indicator 216D on the display which may communicate one or more aspects of the system are available. In FIG. 14, the visual status indicator 216D indicates the differential GPS system is available and thus the graphical user interface 216 displays only live data and a mapped view 216A. In FIG. 15, the visual status indicator is replaced with an alert 216E, indicating the differential GPS system is not currently available. Minor alerts 216E not requiring immediate attention can be hidden during agricultural operations, multiple alerts 216E gathered into a list, and/or alerts 216E always made viewable and/or selectable.

Alerts 216E may be categorized by seriousness of the error, area of interest, duration of the error, and/or when the error was first noted. Both active and historical alerts can be viewed within the system, usually tracked by time. In some embodiments, these alerts 216E can also be tracked geospatially so as to allow a farmer to pick a point of interest on the field 274 to show if there were any alerts active at a time of interest.

The graphical user interface 216 can also provide the user the ability to select actions 216F, via input devices 212 (such as touch screen controls and/or external devices such as mice, virtual reality devices, styluses, or the like, and/or microphones and/or cameras used in connection with virtual assistants and voice recognition software), which allows (e.g. via modules 202, 204, 206) for navigation of the computerized system and/or for the agricultural system to perform certain agricultural tasks. Similarly, safety controls allow the operator is able to engage safety elements on the agricultural implement 110.

Typically included somewhere on the graphical user interface 216 is access to a "settings" menu, which preferably provides the operator the ability to adjust one or more computerized aspects of the intelligent control 152, including but not limited to: display brightness, volume output levels, default language, etc. For example, co-owned and co-pending U.S. Ser. No. 16/420,816, discloses an intelligent control/display unit that includes a settings section. The '816 patent application is incorporated by reference in its entirety and for all purposes. In some embodiments, access to such a settings menu will require the user first touch a home function 216H located somewhere on the display which pulls up a home menu. It is envisioned, but not required, in such embodiments, that the home menu will (a) allow access to software applications useful for other agricultural operations, such as those software applications or computerized aspects disclosed in co-owned/co-pending patent applications: U.S. Serial Nos. 63/007,623 (titled "SIMULTANEOUS MAPPED VIEW OF HISTORICAL AND REAL-TIME GEOSPATIAL AND NON-GEOSPATIAL DATA"), 63/019,032 (titled "SHARED PLANTER DATA"), 62/704,284 (titled "AUTOMATIC FIELD PARTNERS"), 62/704,285 (titled "GPS LOCATION AUGMENTATION AND OUTAGE PLAYTHROUGH"), and 63/018,833 (titled "CONNECTED PLANTER DATA SHARING PLAYTHROUGH"), all of which are herein incorporated by reference in their entireties; (b) allow for operators to download software and/or firmware updates for said software applications; (c) allow operators to access software applications which are only tangentially related (or even not related at all) to agricultural operations, examples of such being software applications for managing calendars and/or observing weather data; and (d) allow operators to access folders and/or other files stored on a local hard drive (e.g. memory 190).

Operation

Figure 16:
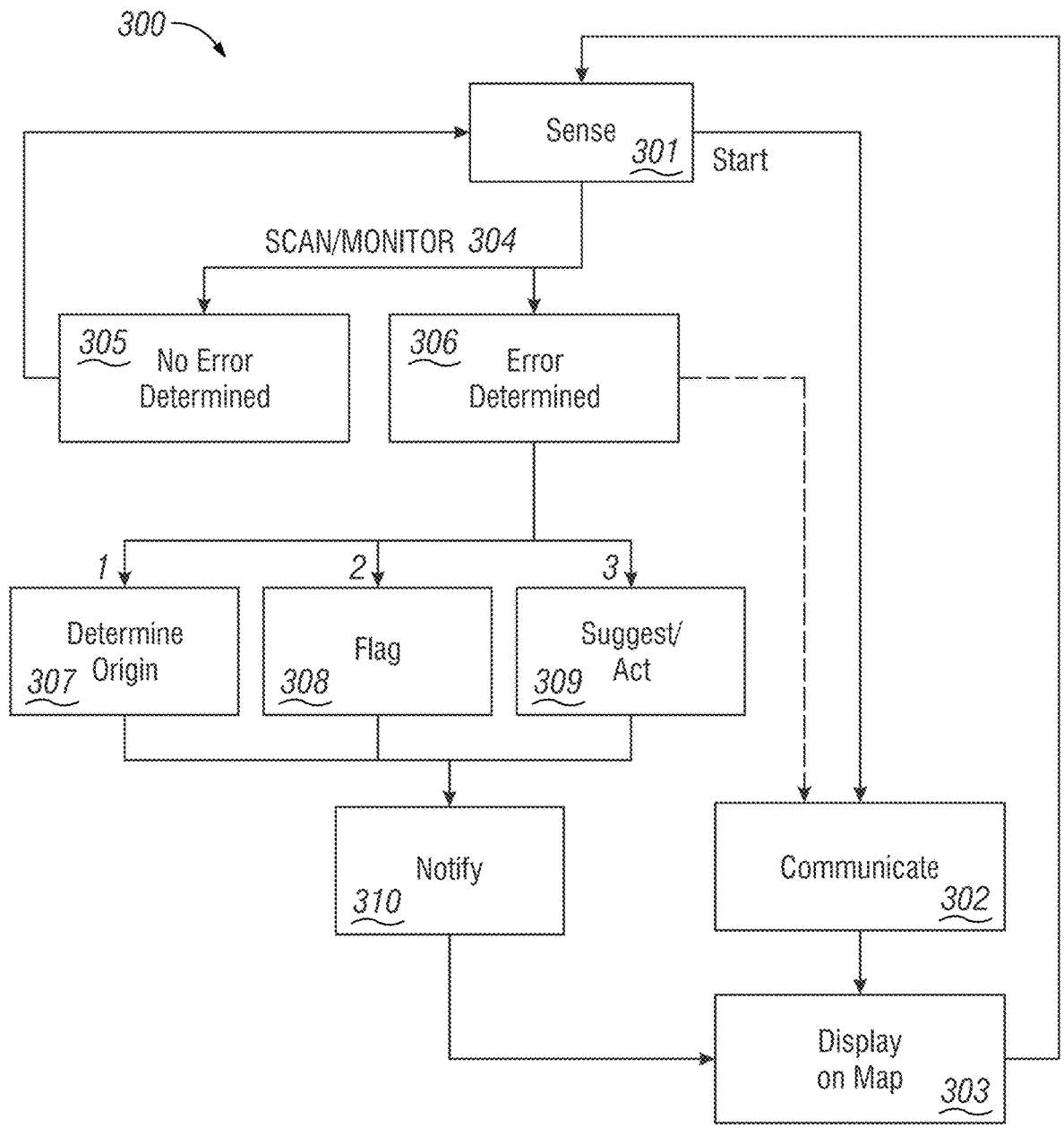
FIG. 16 is a decision tree with exemplary steps to be carried out by a control system for identifying and mitigating issues associated with planting operations.
Figure 17C:
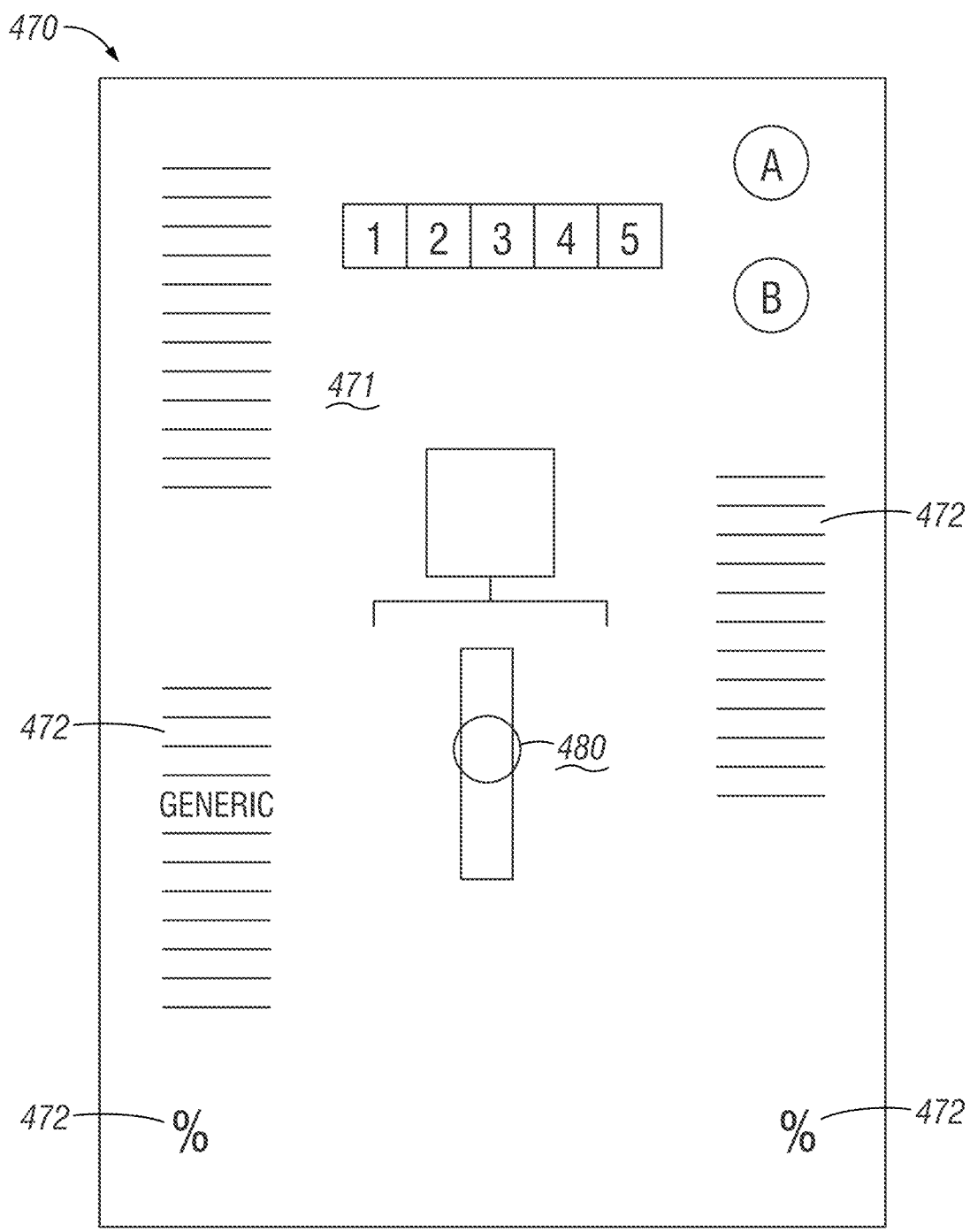
FIG. 17C illustrates a graphical user interface depicting a mapped view just before a portion of the map is to be enlarged.
Figure 17D:
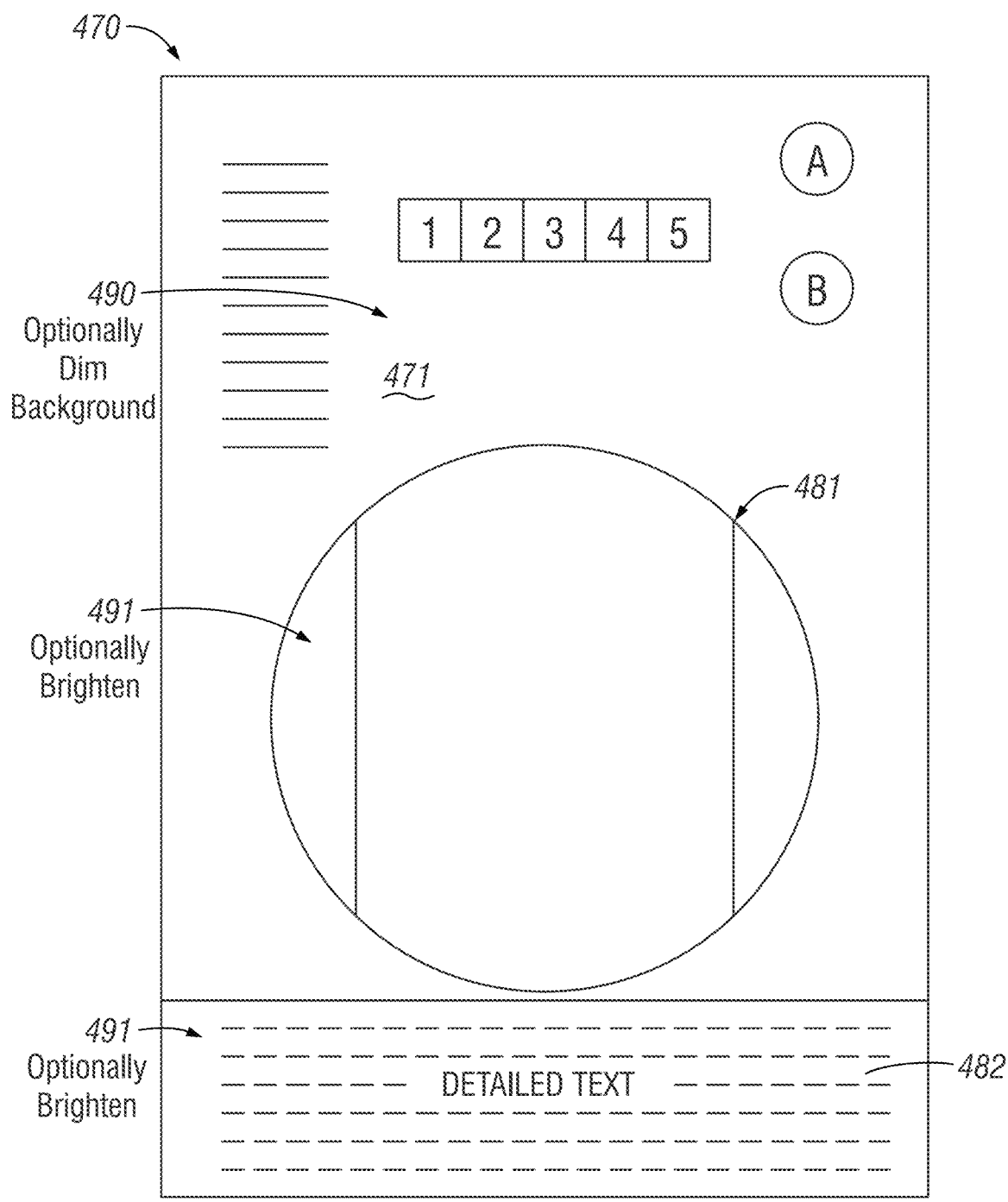
FIG. 17D illustrates a graphical user interface depicting a detailed view placed over the mapped view of FIG. 17C.
Figure 18:
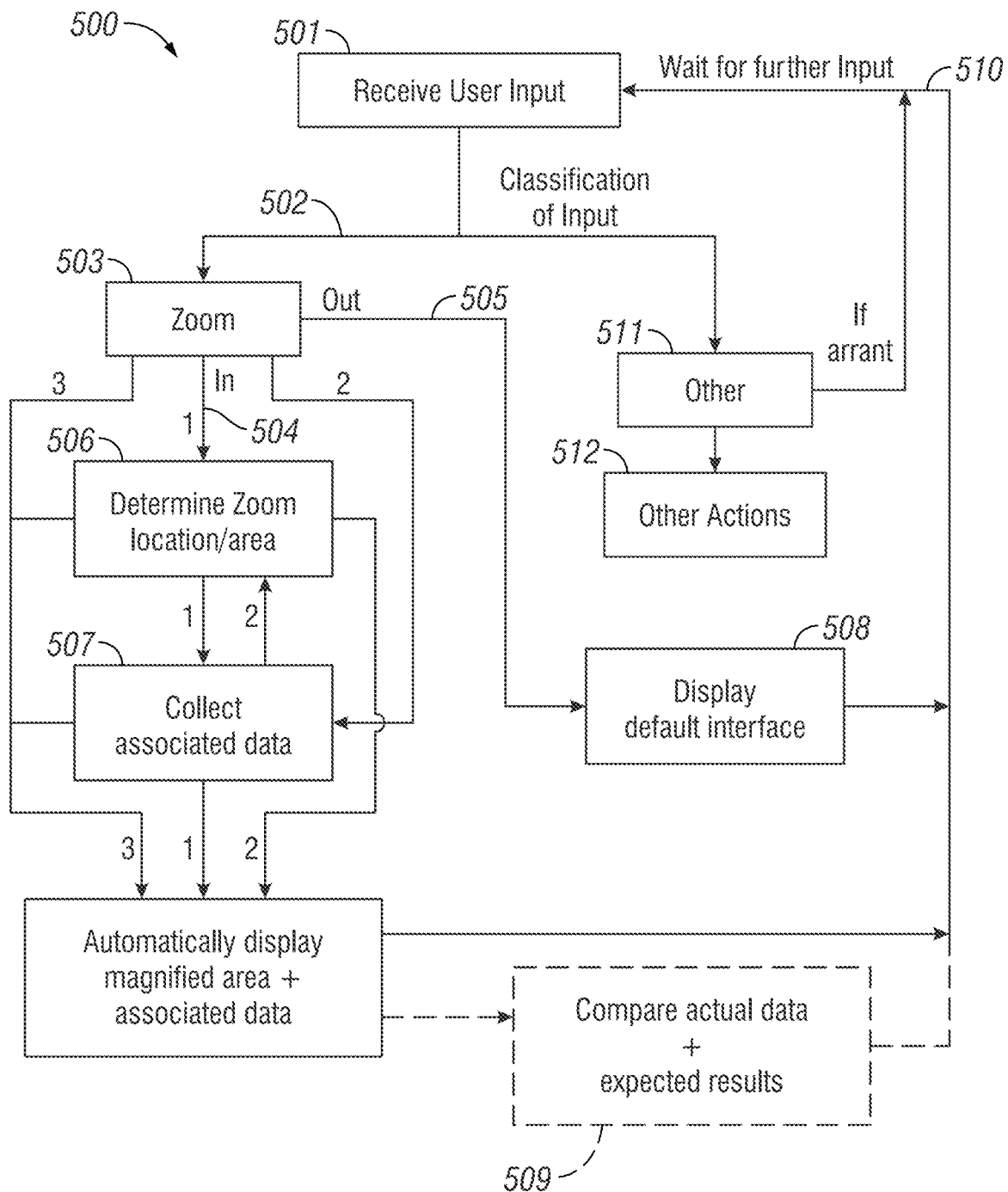
FIG. 18 depicts a decision tree with exemplary steps for automatically executing a zoom feature.

With reference to FIGS. 16-18, specific computerized methods can be practiced in connection with the aforementioned technical components of FIGS. 1-13 and displayed aspects of FIGS. 14-15.

FIG. 16 in particular illustrates a closed-loop method 300 for automatically monitoring for error(s) associated with performance of an agricultural operation, for example while a tractor 100 travels through a field 274. The method 300 relies on a near-continuous sensing step 301 wherein at least some sensors of the agricultural system are constantly operating, seeking to gather as much information about surrounding agricultural characteristics so as to calculate and otherwise provide accurate agricultural data 208. When carrying out method 300, and any computerized method in general, it is to be appreciated that those non-vital sensors for a particular method can be idled, turned off, and/or otherwise limited in functionality so as to preserve power and enhance performance for the system.

Likewise, the agricultural data 208, is communicated in a communicating step 302 to the touch-screen display/intelligent control unit 152 near continuously, such that an operator can view, after a mapped display step 303 has been carried out, time-stamped, geospatial agricultural data 208 in real-time or substantially real-time, on the touch-screen display.

Tracking, saving, and communication of environmental data can also be likewise and/or simultaneously communicated along with crop data. Rather than simply having machine performance or in-ground data, environmental data (e.g. relative humidity, temperature, etc.) can be captured geospatially at the time of planting and potentially display that within the numeric, textual, and/or detailed information of detailed view 216B, high-level generic information 216G, and/or individualized information 216I.

All the while, the intelligent control 152 scans in a monitoring step 304 for potential inefficiencies associated with the agricultural operation. To carry out the monitoring step 304, the intelligent control 152 can actually encompass many minor tasks and/or steps, including, but not limited to: using visual sensors or radar to detect obstructions within a field 274, calculate ratios of seeds successfully planted, graph up/down force on row units as a function of time, track remaining weight of seed stored in a hopper, indicate when a sensed value falls below a certain threshold and/or target, etc.

If it is determined that there are no errors 305, or even that there are no substantial errors, the system will revert to sensing 301/communicating 302 agricultural data 208 and/or scanning/monitoring 304 for further potential issues.

If it is determined that there is an error 306, the intelligent control 152 will preferably work to accomplish a series of steps which help facilitate the operator's experience or expedite the process for mitigating such an error. For example, the intelligent control 152 might first identify the origin of the error in an identifying step 307. Such origins include, but are not limited to: human error; mechanical and/or electrical failures, such as those from wear and tear; and uncontrollable factors, such as a weather condition.

The intelligent control 152 might secondly flag (e.g. with color indicator 216C, an object indicator, or the like) in a flagging step 308 area(s) where errors have occurred 216X on the touch-screen display. Other means for flagging errors include, but are not limited to: aggregating errors into a list (especially where said errors are minor); communicating information about said errors to other computerized devices;

Finally, the intelligent control 152 might determine an action to take in an action step 309. If such an action is capable of being carried out without user input, the intelligent control 152 will notify in a notification step 310 the user the intelligent control is taking automatic action and subsequently instruct and/or otherwise actuate a component of the agricultural system to compensate for the error. Else, the intelligent control 152 will, in the notification step 310, output a suggestion to the operator for mitigating such an error through a preferred output means. Where errors are less serious, they might simply get pushed to the background of said touch-screen display and mitigation of the error may be deferred until a more convenient time. Where errors are serious but not fatal, an appropriate means for suggestion taking corrective action should be employed, such as using visual indicators (flashing alerts, warning screens, and any other suitable means for alerting an operator). Where errors may cause substantial bodily and/or financial harm or even death, the system may automatically utilize safety features, such as a kill switch, to prevent further operation of the agricultural system.

It can be important to record precise GPS coordinates where certain corrective action has been taken and/or where errors are identified, such that the computerized can better display in the display step 303 aspects of the actual agricultural operation to the operator. It should again be mentioned that the closed loop system and method which carries out steps 301-310 is a continuous process, so long as the system has power and/or not purposefully disabled by an operator of the agricultural implement.

Area(s) flagged with errors 216X can be touched with a scrolling gesture, double-tapped, pinched (see e.g. U.S. Pat. No. 7,844,915), and/or the like on the mapped graphical user interface 216A in problem area(s) 216X so as to instruct the intelligent control 152 to provide a more detailed view 216B and to also provide additional numerical and textual information 216N associated with the same.

There are thus a few advantageous computerized features which can help accomplish such action, but are not required in all instances. They include: (i) enlarging and minimizing images; (ii) doing so as a result of a specific input; and (iii) upon so doing, automatically selecting unique, relevant data 208 to show the operator.

With respect to the magnification of images, any such suitable magnification technique, including those perfect image transformation, can be employed. For example, the known technique, bilinear interpolation (which does not usually achieve perfect image transformation), can be used, and any such suitable algorithm, such as those 400, 450 depicted in FIGS. 17A-B, employed. The algorithm 400 uses linear interpretation of pixels of images in the x (via step 401) and y (via step 402) directions so as to yield the result shown in step 403 to resample images and textures. Another such suitable bilinear interpolation algorithm 450 is shown in FIG. 17B. The algorithm 450 uses a linear system of matrices 452, 463 and other calculations/simplifications 453 to solve for coefficients within the mathematically correct expressions 451, 461 shown. In other words, bi-linear interpretation can be used to map a screen pixel location to a corresponding point on the texture map. A weighted average of the attributes (color, transparency, etc.) of the four surrounding texels is computed and applied to the screen pixel. This process is repeated for each pixel forming the object being textured. When an image needs to be scaled up, each pixel of the original image needs to be moved in a certain direction based on the scale constant. However, when scaling up an image by a non-integral scale factor, there are pixels (i.e., holes) that are not assigned appropriate pixel values. In this case, those holes should be assigned appropriate RGB or grayscale values so that the output image does not have non-valued pixels.

Again, it should be mentioned that any suitable means for scaling an image can be employed, and particular methods for scaling such images are application specific. For example, nonlinear iterative procedures which take into account information about discontinuities or sharp luminance variations while doubling the input picture may be preferred for the detailed view 216B.

How such magnification is displayed can also be varied, so as to encompass aspects which are distinct from separate, detailed view 216B. As seen in the graphical user interface 470 illustration provided in FIGS. 17C-D, generic information 472 is deemphasized, partially covered, but partially shown in background 471 during magnification of geographic area 480. Background 471 may be optionally dimmed in a dimming step 490 during such magnification, and magnification area 481 may be brightened or otherwise emphasized so as to draw attention to detailed textual and numeric information 482.

To determine whether transition from mapped view 216A to detailed view 216B is necessary, a method 500 for creating the detailed view 216B can be carried out by the intelligent control 152. The closed loop method begins where user input is given in a receiving step 501. The intelligent control 152 then classifies the user input in a classification step 502 as a zoom command 503 or an "other" command 511. If the user input is classified as a zoom command 503 must be further determined whether the zoom command 503 is a "zoom in" command 504 or a "zoom out" command 505. If zooming out, the graphical user interface 216 can simply revert to showing the default, mapped view 216A.

If zooming in, the intelligent control 152 must, in a locating and magnifying step 506, determine the area to be magnified and employ a suitable means for magnification (e.g. using bilinear interpolation or another suitable method); prior to, simultaneously with, or subsequent to step 506 (indicated by paths 1, 2, and 3), the intelligent control 152 in a selection step 507 collects associated detailed textual and numerical information to display. Thereafter, the intelligent control 152 will instruct the graphical user interface 216 to automatically display the magnified area adjacent the detailed information 216N in a display step 508, which may optionally include comparison 509 of actual data and/or expected results with respect to the agricultural operation being performed. The method 300 begins again and waits for further input via waiting step 510.

It should be appreciated the system is closed loop because if the input were classified as an "other" command 511, the system will proceed to the waiting step 510 if it is determined that the command was errant (e.g. a random touch) or after it accomplished such other actions 512 which result from the other, specific command, which could for example be opening the home menu by way of home function 216H.

From the foregoing, it can be seen that the present invention accomplishes at least all of the stated objectives.

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

In communications and computing, a computer readable medium is a medium capable of storing data in a format readable by a mechanical device. The term "non-transitory" is used herein to refer to computer readable media ("CRM") that store data for short periods or in the presence of power such as a memory device.

ISO 11783, known as Tractors and machinery for agriculture and forestry—Serial control and communications data network (commonly referred to as "ISO Bus" or "ISOBUS") is a communication protocol for the agriculture industry based on the SAE J1939 protocol (which includes CANbus). The standard comes in 14 parts: ISO 11783-1: General standard for mobile data communication; ISO 11783-2: Physical layer; ISO 11783-3: Data link layer; ISO 11783-4: Network layer; ISO 11783-5: Network management; ISO 11783-6: Virtual terminal; ISO 11783-7: Implement messages application layer; ISO 11783-8: Power train messages; ISO 11783-9: Tractor ECU; ISO 11783-10: Task controller and management information system data interchange; ISO 11783-11: Mobile data element dictionary; ISO 11783-12: Diagnostics services; ISO 11783-13: File server; ISO 11783-14: Sequence control.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A computerized method for use with an agricultural implement comprising:
   sensing agricultural characteristics associated with one or more agricultural implements;
   communicating, in real-time, agricultural data associated with the agricultural characteristics, said agricultural data being time-stamped and geo-spatial;
   displaying on a map and in real-time, the agricultural data on a touch-screen display;
   after touching a mapped interface displayed with the touch-screen display, providing:
   (i) a detailed view of a portion of said map; and
   (ii) numerical and textual information associated with agricultural data relating to said portion of said map, wherein the numerical and textual information comprises actual data associated with an agricultural operation of the one or more agricultural implements relating to said portion of said map and expected data associated with the agricultural operation of the one or more agricultural implements relating to said portion of said map.

2. The computerized method of claim 1, further comprising conserving electrical power to and/or adjusting a brightness of the touch-screen display.

3. The computerized method of claim 1, further comprising tracking a geographic location of the one or more agricultural implements.

4. The computerized method of claim 1, identifying errors in the agricultural operation by determining if a value associated with a sensed agricultural characteristic has fallen below a minimum threshold or risen above a maximum threshold.

5. The computerized method of claim 4, further comprising automatically sending a notification for a confirmed error if the confirmed error persists for a predetermined length of time or a predetermined distance of travel.

6. The computerized method of claim 4, further comprising coloring a portion of said map associated with the error.

7. The computerized method of claim 4, further comprising suggesting a task to be performed and/or a mitigation technique based on the error.

8. The computerized method of claim 4, further comprising identifying a cause of the error.

9. The computerized method of claim 8, further comprising taking action in response to said error, said action optionally selected from the group consisting of:
   (a) manually and/or automatically disabling a component, a group of components, and/or an order of components associated with the one or more agricultural implements;
   (b) applying more or less down and/or up pressure to said component, said group of components, and/or said order of components; and
   (c) adjusting an operating rate of said component, said group of components, and/or said order of components.

10. The computerized method of claim 9, further comprising providing computerized feedback relating to whether said action was effective in remedying the error.

11. The computerized method of claim 10, further comprising using artificial intelligence (AI) and/or machine learning (ML) to analyze said computerized feedback in an effort to improve future agricultural operations over time.

12. The computerized method of claim 1, further comprising selecting an agricultural task to perform with a first and/or second agricultural implement of the one or more agricultural implements, the agricultural task being selected from the group consisting of (a) planting; (b) tilling; (c) baling; (d) harvesting; (e) spraying; (f) transporting; (g) cultivating; (h) harrowing; (i) plowing; (j) fertilizing; (k) broadcasting; (l) loading; and (m) unloading.

13. A non-transitory computer readable medium for use with an agricultural implement and having a processor, a memory, an operating system, and a compiler, said non-transitory computer readable medium comprising:
   a touch-screen display;
   a transmitter capable of employing at least one communication protocol and connecting to a network; and
   a display module configured to instruct the processor to execute software and/or firmware stored within the memory;

wherein the processor can execute the software and/or firmware such that:
  time-stamped and/or geo-spatial agricultural data associated with sensed agricultural characteristics can be communicated and displayed on a map in real-time; and
  error(s) associated with performance of an agricultural operation are automatically identified;
  if touched, a mapped interface displayed with the touch-screen display provides:
    (i) a detailed view of a portion of said map; and
    (ii) numerical and textual information associated with agricultural data relating to said portion of said map, wherein the numerical and textual information comprises actual data associated with an agricultural operation of the agricultural implement relating to said portion of said map and expected data associated with the agricultural operation of the agricultural implement relating to said portion of said map.

14. The non-transitory computer readable medium of claim 13, wherein the communication protocol is ISO 11783 (ISOBUS).

15. The non-transitory computer readable medium of claim 13, wherein the communication protocol is Internet Protocol (IP), the IP is carried over Ethernet, and the non-transitory computer readable medium utilizes Power over Ethernet (POE).

16. The non-transitory computer readable medium of claim 13, wherein the transmitter is a wireless transmitter and the wireless transmitter communicates via Wi-Fi.

17. An agricultural system comprising:
  a cab;
  an agricultural implement;
  sensors proximate the agricultural implement for sensing agricultural characteristics;
  a touch-screen display located on the cab or the agricultural implement;
  a transmitter capable of employing at least one communication protocol and connecting to a network; and
  a non-transitory computer readable medium comprising:
    a processor;
    a memory;
    an operating system;
    a compiler; and
    a display module configured to instruct the processor to execute software and/or firmware stored within the memory;
  wherein the processor can execute the software and/or firmware such that:
    time-stamped and/or geo-spatial agricultural data associated with sensed agricultural characteristics can be communicated and displayed on a map in real-time; and
    error(s) associated with performance of an agricultural operation are automatically identified;
    if touched, a mapped interface displayed with the touch-screen display provides:
      (i) a detailed view of a portion of said map; and
      (ii) numerical and textual information associated with agricultural data relating to said portion of said map, wherein the numerical and textual information comprises actual data associated with an agricultural operation of the agricultural implement relating to said portion of said map and expected data associated with the agricultural operation of the agricultural implement relating to said portion of said map.

18. The agricultural system of claim 17, wherein the agricultural implement is a planter comprising a toolbar, wheels or tracks attached to the toolbar, row units attached to the toolbar, and hoppers for storing seed, and further wherein the row units are configured to be manually and/or automatically shut off from dispensing seed based upon identified errors.

19. The agricultural system of claim 18, wherein the planter further comprises cylinders which automatically apply a down force based upon the agricultural data.

20. The agricultural system of claim 17, further comprising a global positioning system (GPS) receiver and/or navigation system.

* * * * *